US009709782B2

(12) United States Patent
Yamada

(10) Patent No.: US 9,709,782 B2
(45) Date of Patent: Jul. 18, 2017

(54) IMAGE-CAPTURING OPTICAL SYSTEM, IMAGE-CAPTURING OPTICAL APPARATUS AND DIGITAL DEVICE

(71) Applicant: KONICA MINOLTA, INC., Chiyoda-ku (JP)

(72) Inventor: Keiko Yamada, Sakai (JP)

(73) Assignee: Konica Minolta, Inc, Tokyo (JP)

(*) Notice: Subject to any disclaimer, the term of this patent is extended or adjusted under 35 U.S.C. 154(b) by 342 days.

(21) Appl. No.: 14/696,051

(22) Filed: Apr. 24, 2015

(65) Prior Publication Data
US 2015/0309293 A1    Oct. 29, 2015

(30) Foreign Application Priority Data

Apr. 28, 2014  (JP) .................................. 2014-092429

(51) Int. Cl.
| | | |
|---|---|---|
| *G02B 1/00* | (2006.01) | |
| *G02B 13/00* | (2006.01) | |
| *G02B 9/64* | (2006.01) | |
| *G02B 9/06* | (2006.01) | |
| *G02B 15/22* | (2006.01) | |
| *H04N 5/232* | (2006.01) | |
| *H04N 5/369* | (2011.01) | |
| *H04N 5/225* | (2006.01) | |

(52) U.S. Cl.
CPC .......... *G02B 15/22* (2013.01); *H04N 5/23209* (2013.01); *H04N 5/23212* (2013.01); *H04N 5/3696* (2013.01); *H04N 5/2254* (2013.01)

(58) Field of Classification Search
CPC ........ G02B 15/22; G02B 15/161; G02B 9/04; G02B 9/06; G02B 13/02; G02B 13/16; G02B 15/163; G02B 9/08; G02B 9/12; G02B 9/34; G02B 9/60; G02B 9/62; G02B 9/64; G02B 15/177; G02B 13/04; G02B 13/22; G02B 13/18; G02B 15/14; G02B 15/16; G02B 27/646; G02B 13/009; G02B 13/06; G02B 13/00; G02B 1/00; G02B 13/003; G02B 13/24

USPC ........ 359/680–682, 749–753, 791, 784, 780, 359/779, 772, 771, 769, 768, 767, 764, 359/763, 760, 759, 757, 756, 754, 748, 359/689, 686, 685, 683, 794

See application file for complete search history.

(56) References Cited

U.S. PATENT DOCUMENTS

2015/0098138 A1* 4/2015 Shirasuna ............. G02B 13/04
359/749

FOREIGN PATENT DOCUMENTS

| | | |
|---|---|---|
| JP | 2013-182024 | 9/2013 |
| JP | 2013-186458 | 9/2013 |

* cited by examiner

*Primary Examiner* — Scott J Sugarman
*Assistant Examiner* — Henry Duong
(74) *Attorney, Agent, or Firm* — Cozen O'Connor

(57) ABSTRACT

An image-capturing optical system includes: a positive first lens group; and a positive second lens group, wherein the positive first lens group and the positive second lens group are arranged in order from an object side in the image-capturing optical system, the image-capturing optical system focuses on a close object by moving the second lens group as a whole along a light axis toward the object side, a lens closest to the object side in the second lens group has a convex surface facing the object side, a lens closest to an image side in the second lens group is a positive meniscus lens having a convex surface facing the image side, the image-capturing optical system satisfies following condition expressions (1) to (3)

$2.2 < Gr\_Fl/FL < 3.8$  (1)

$0.9 < 2Gr\_Fl/FL < 1.5$  (2), and $0.45 < 1Gr\_R\_nop/1Gr\_Thi < 0.85$  (3).

10 Claims, 36 Drawing Sheets

EX1-POS1

EX1-POS1

EX7-POS1

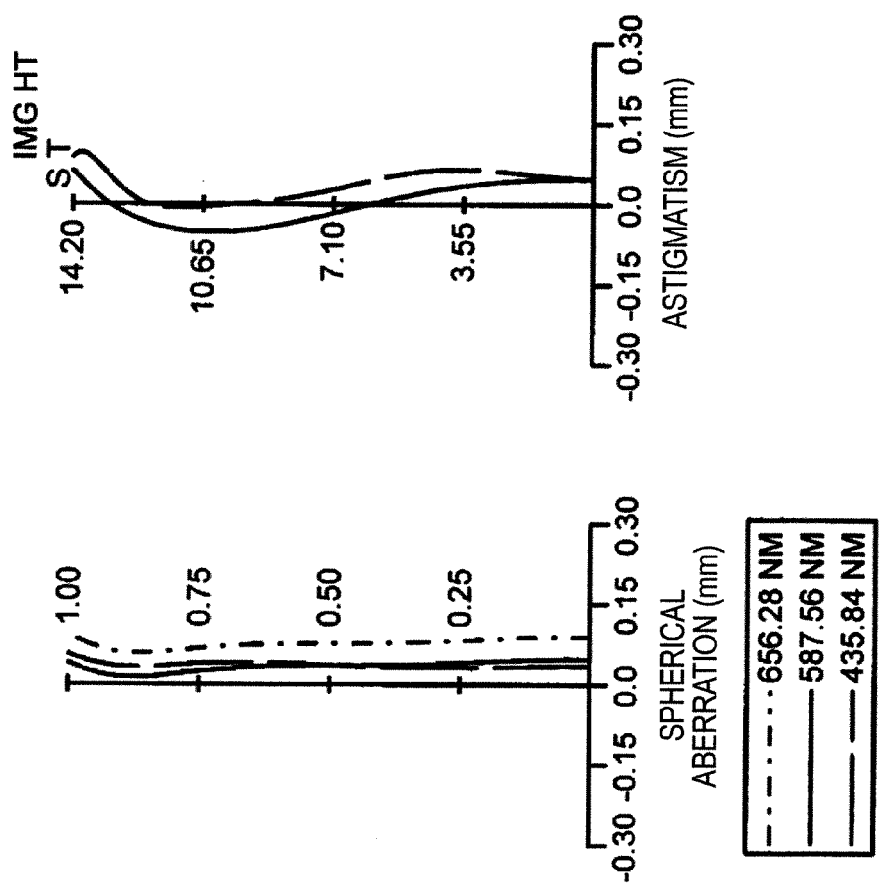
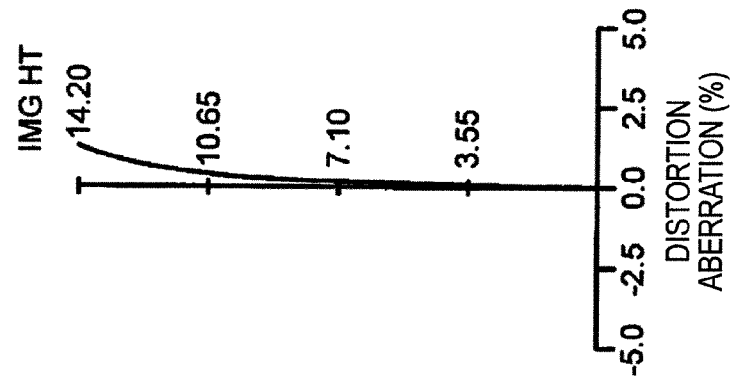
FIG. 8A EX1-POS1
FIG. 8B EX1-POS1
FIG. 8C EX1-POS1

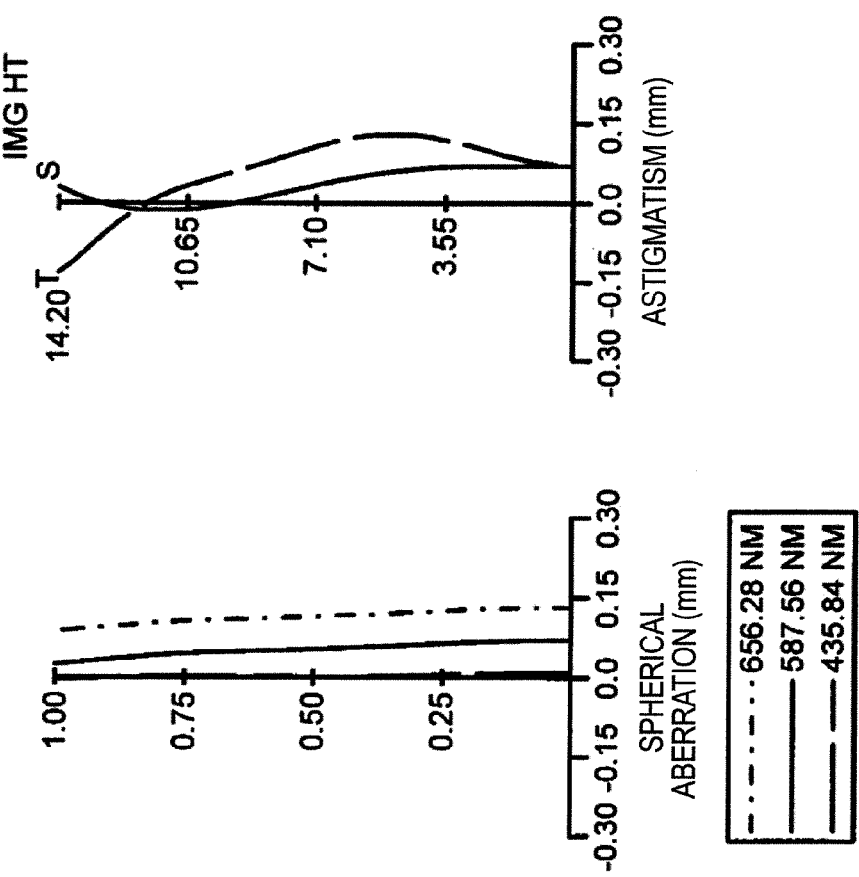
FIG. 8F EX1-POS2
FIG. 8E EX1-POS2
FIG. 8D EX1-POS2

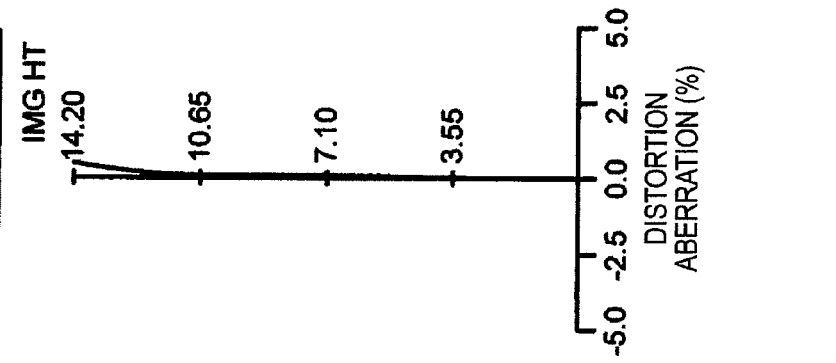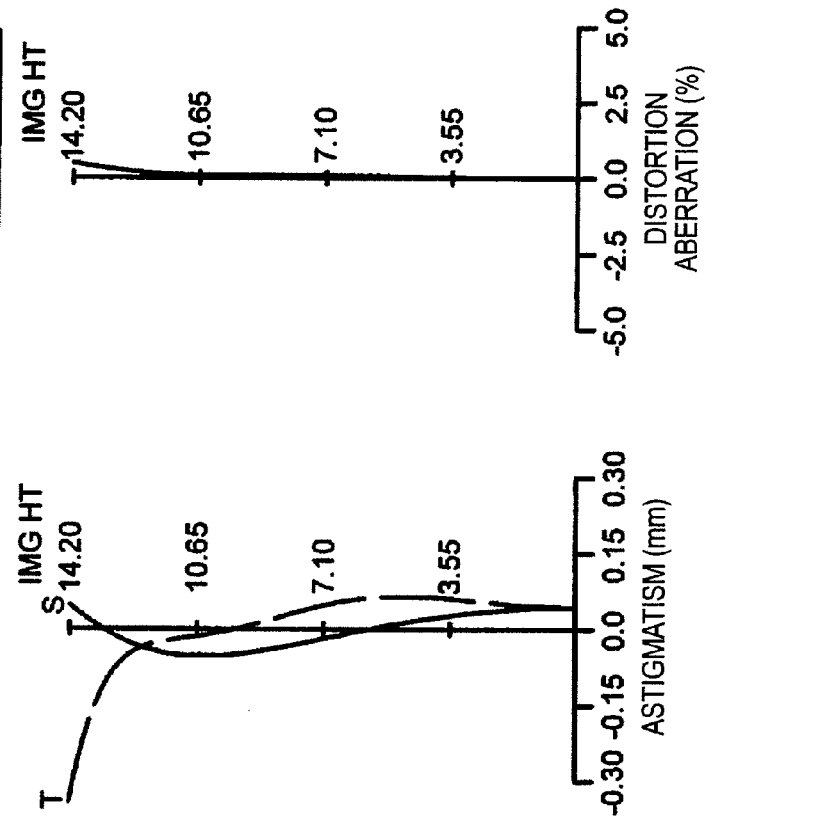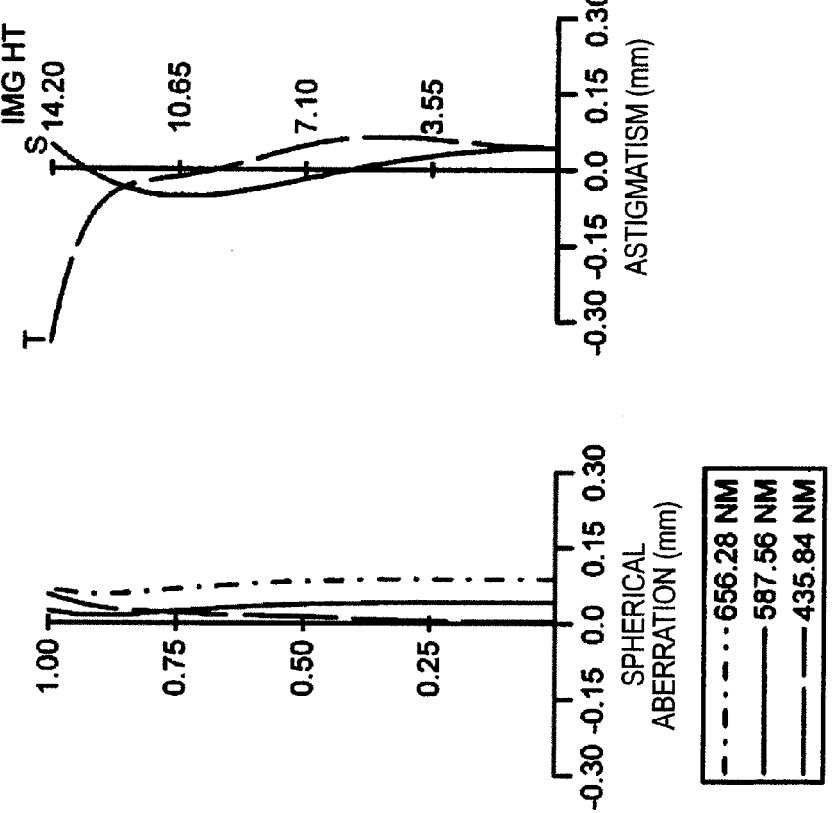

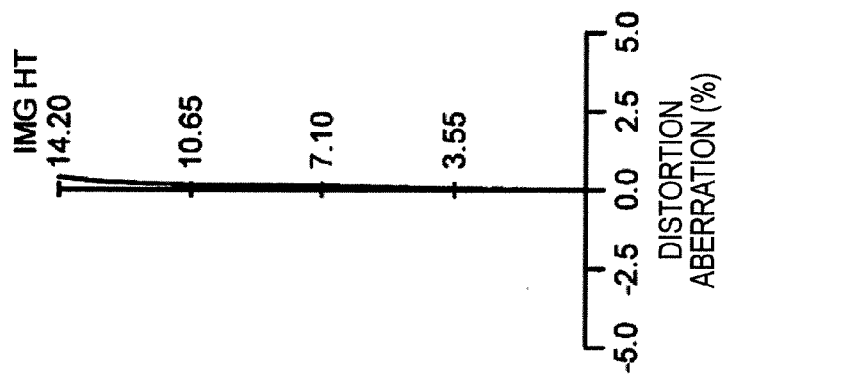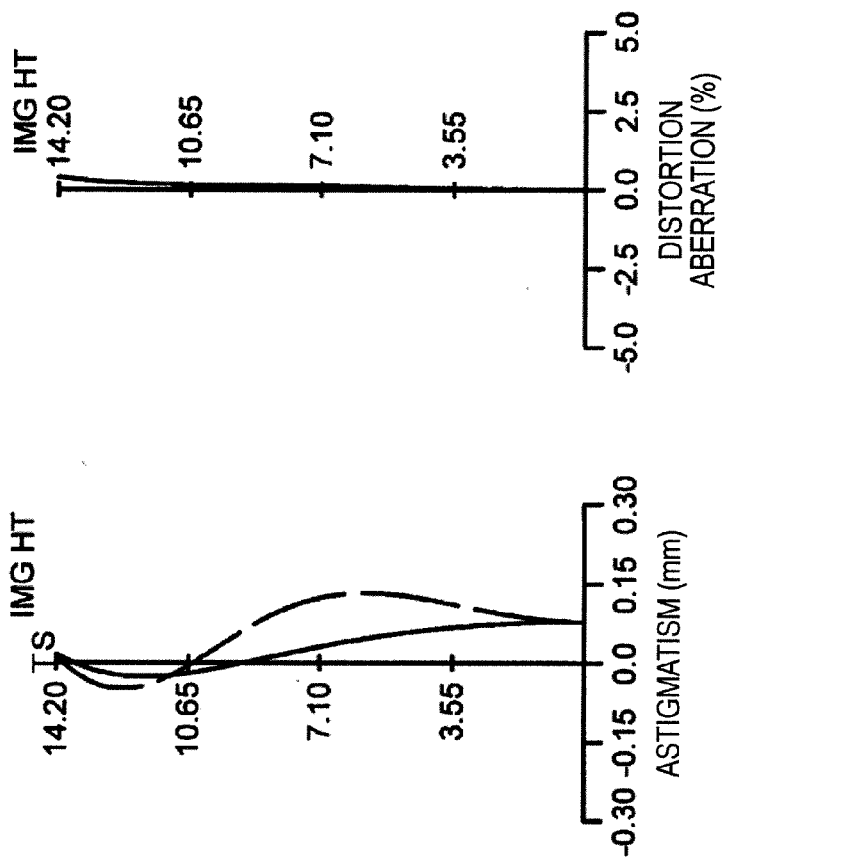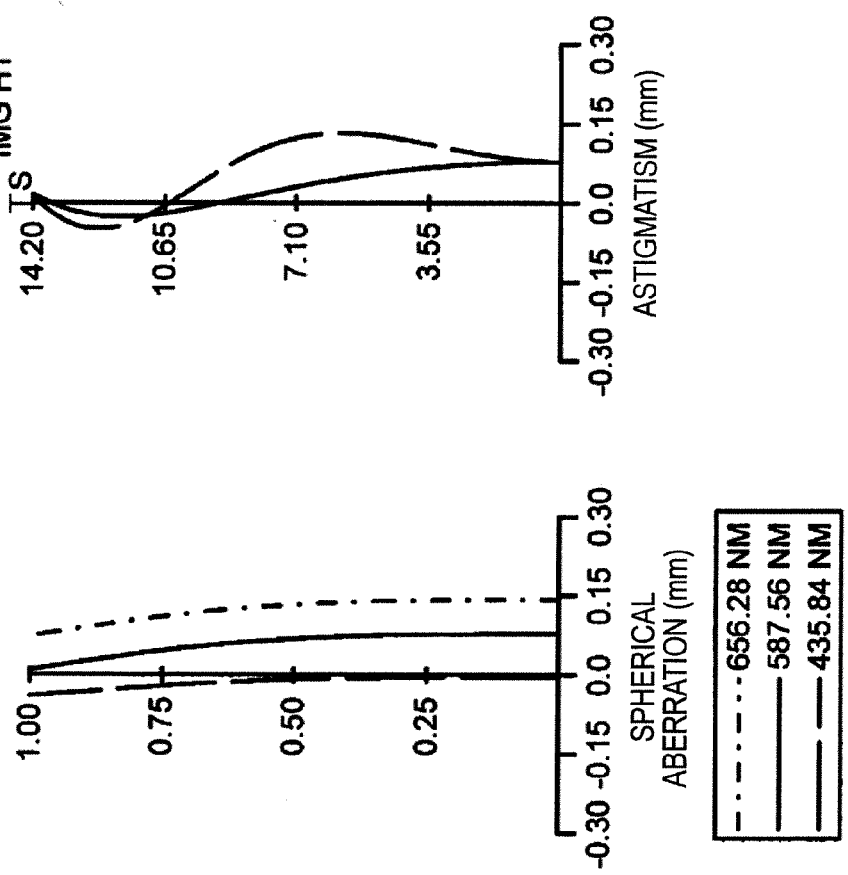

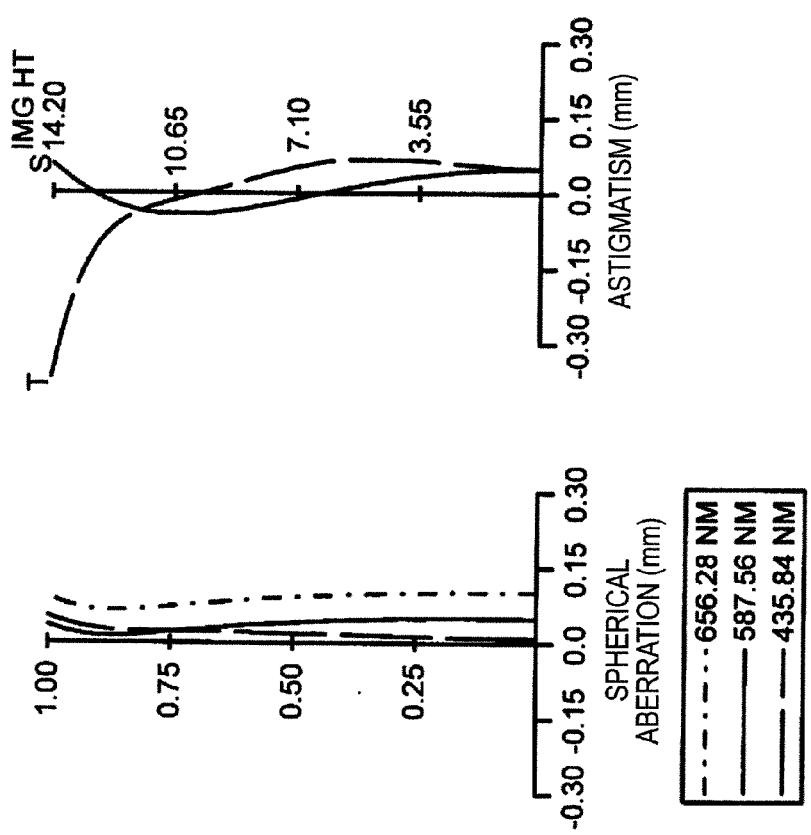
FIG. 10A EX3-POS1
FIG. 10B EX3-POS1
FIG. 10C EX3-POS1

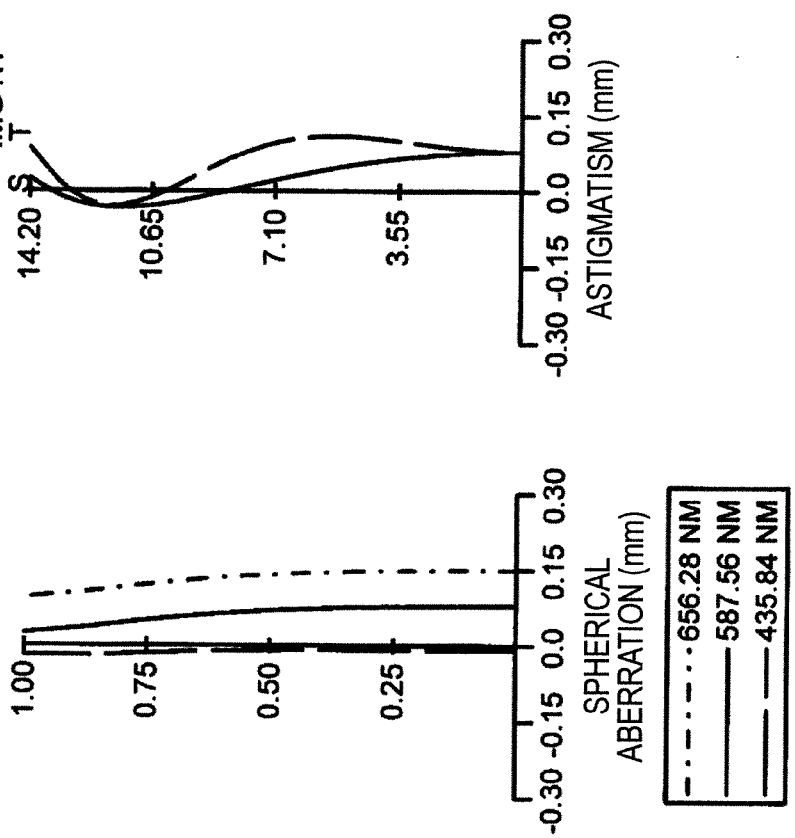
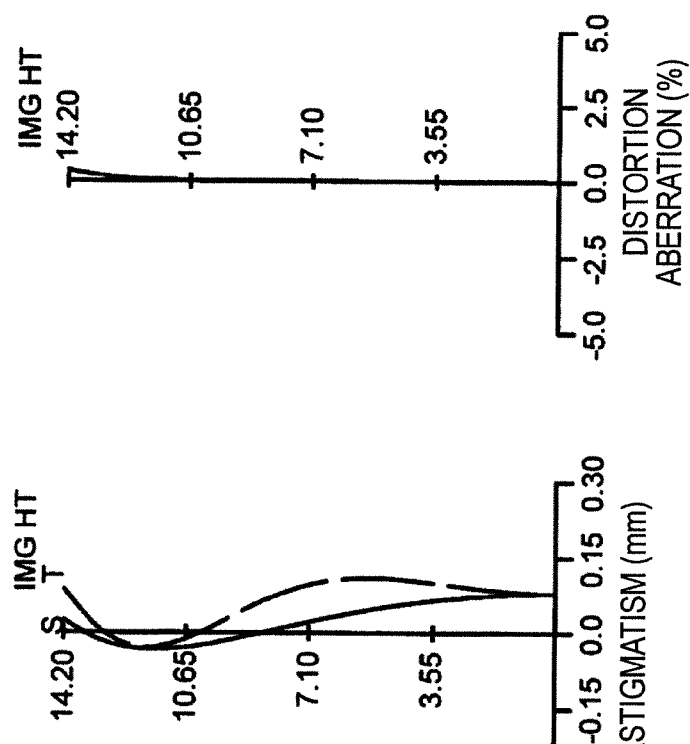
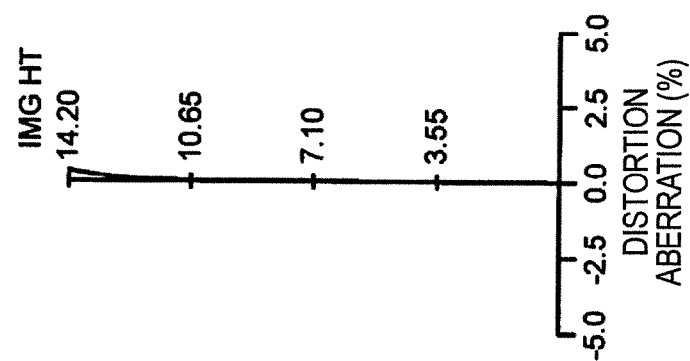
FIG. 10D EX3-POS2
FIG. 10E EX3-POS2
FIG. 10F EX3-POS2

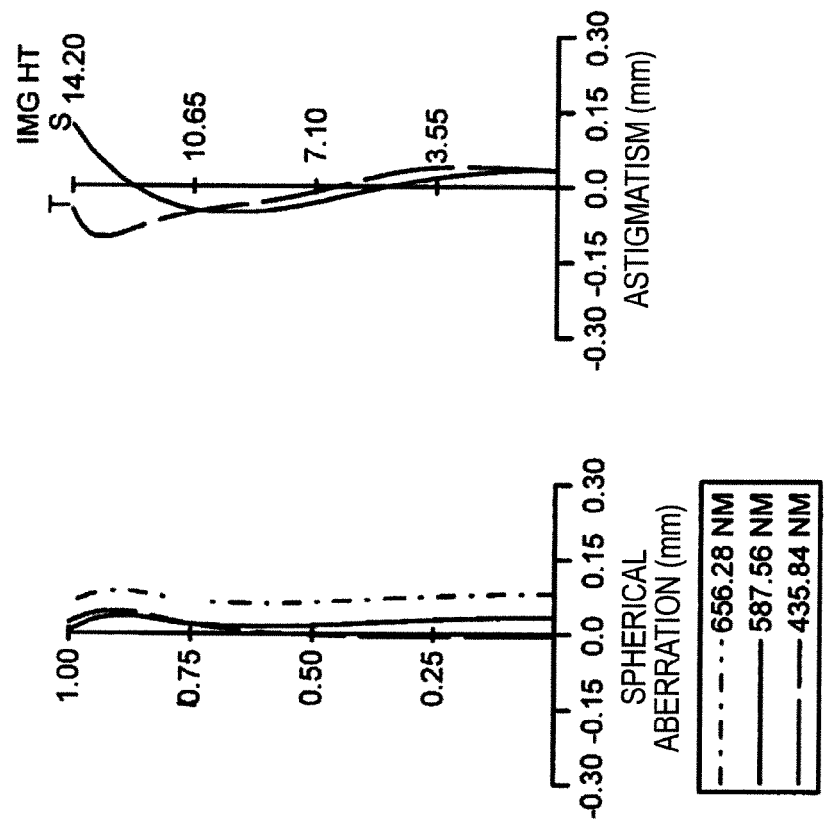

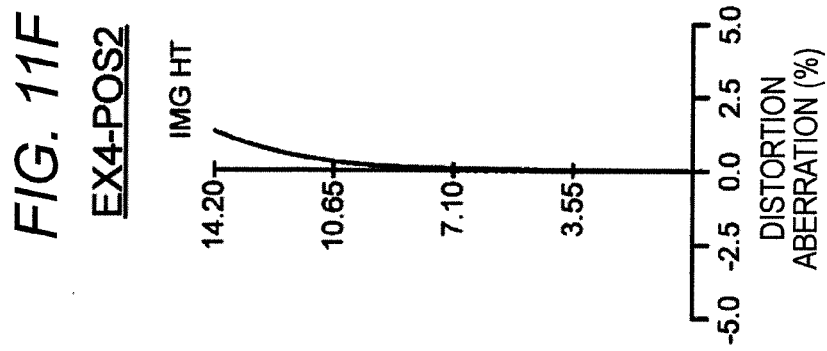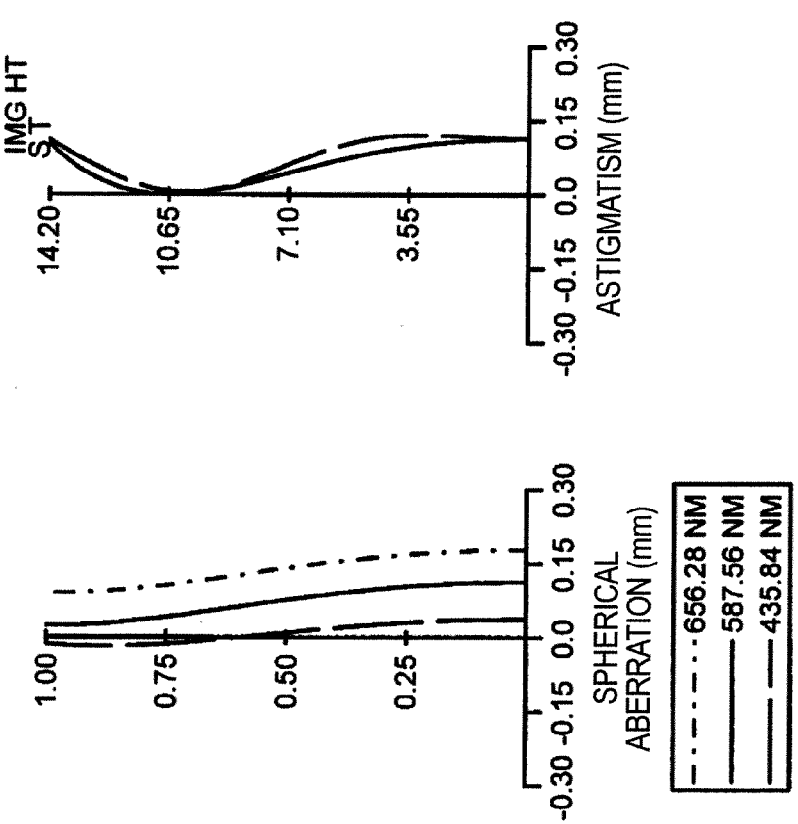

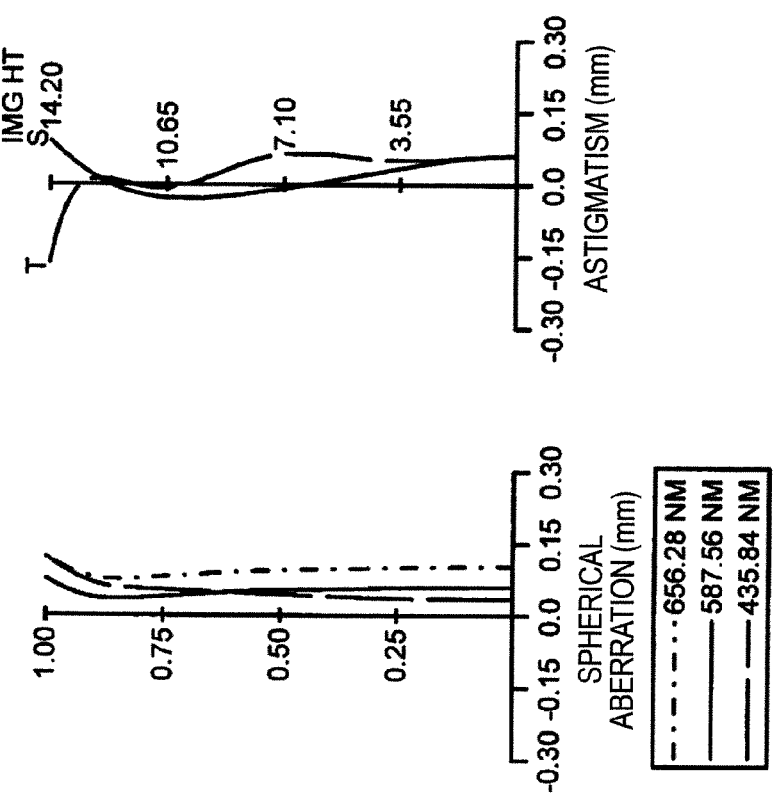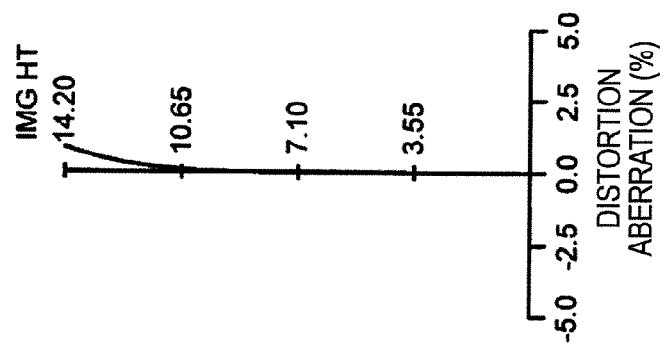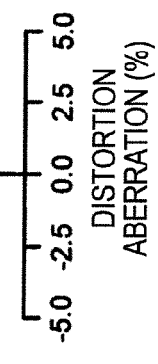

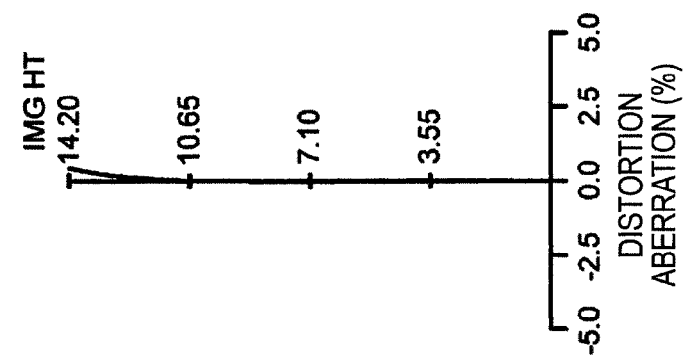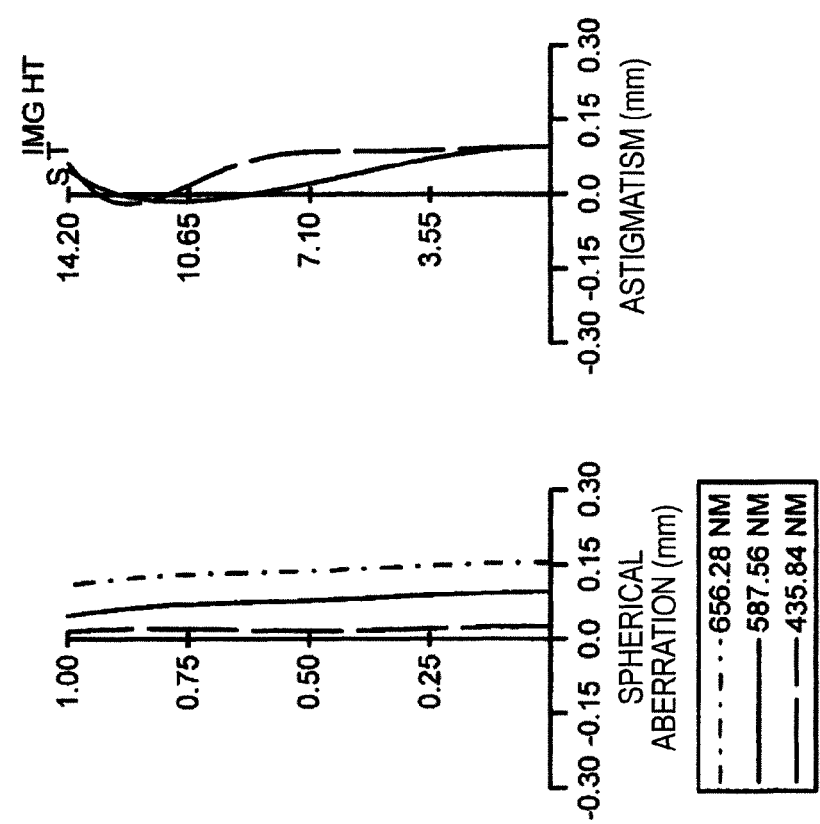

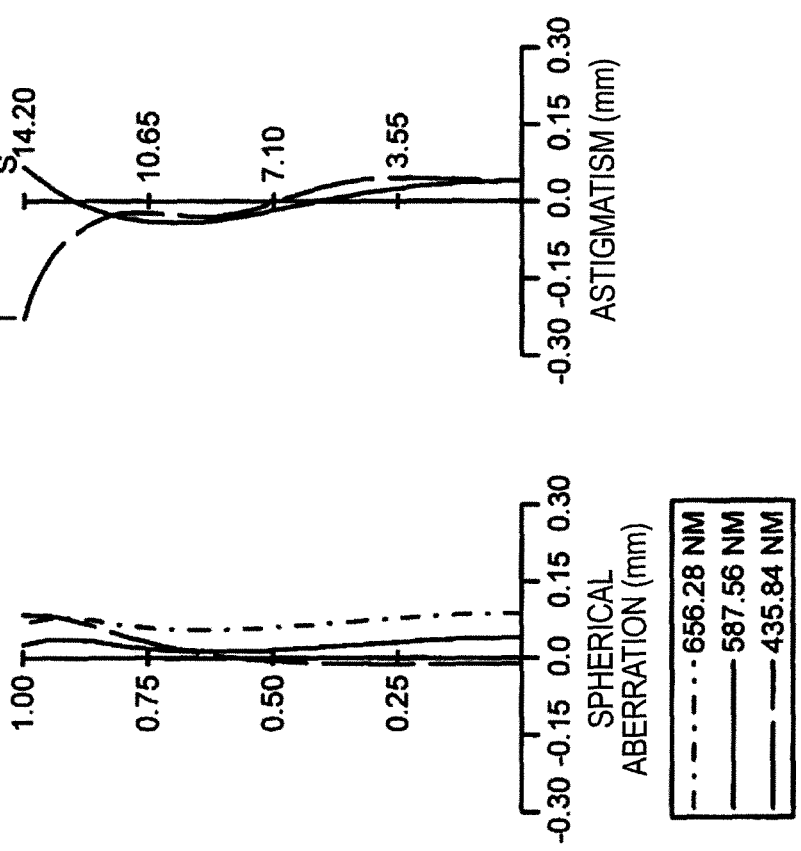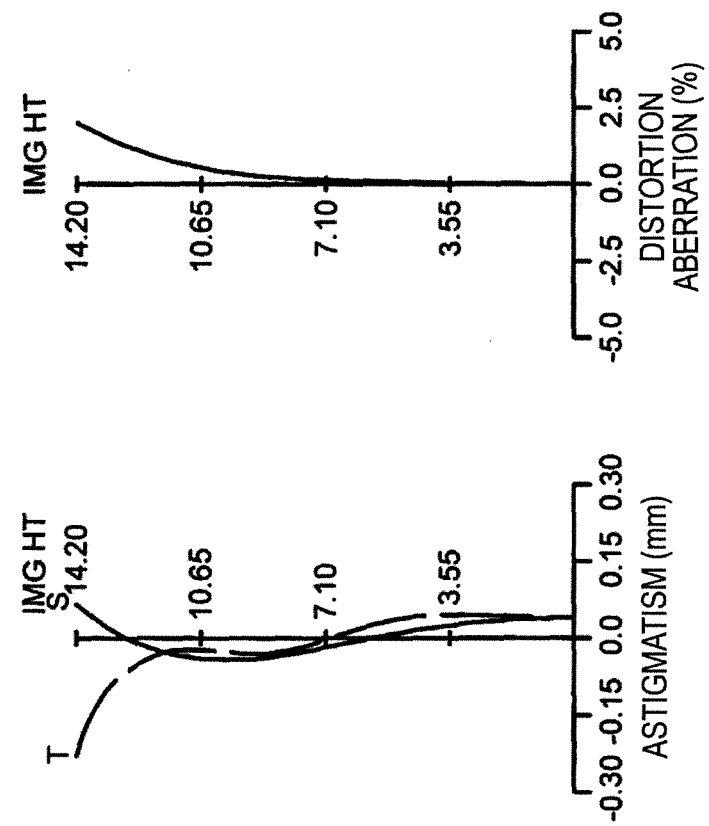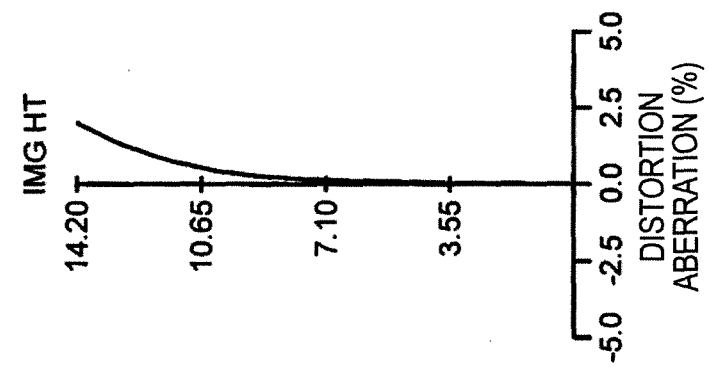

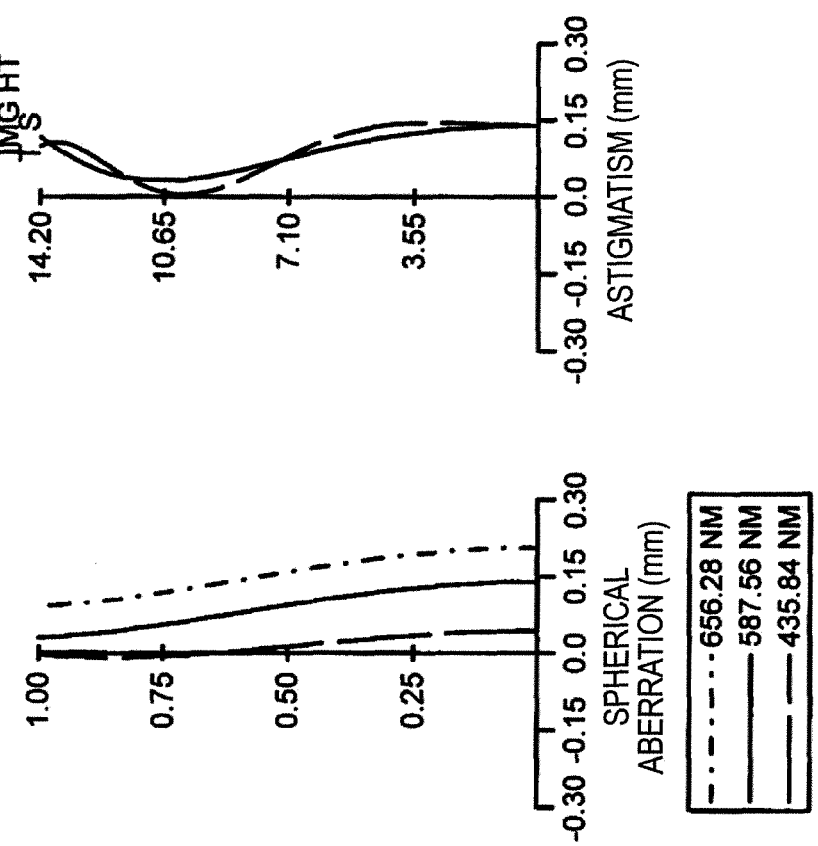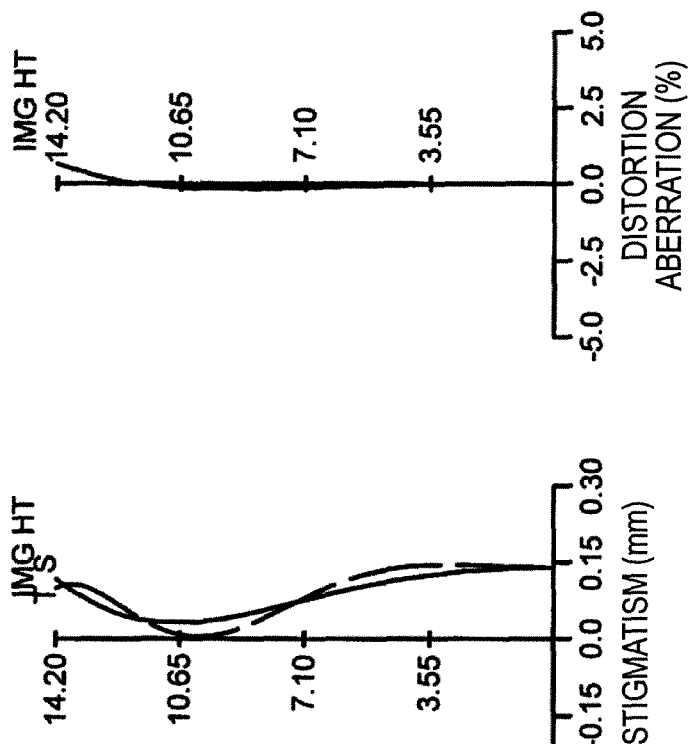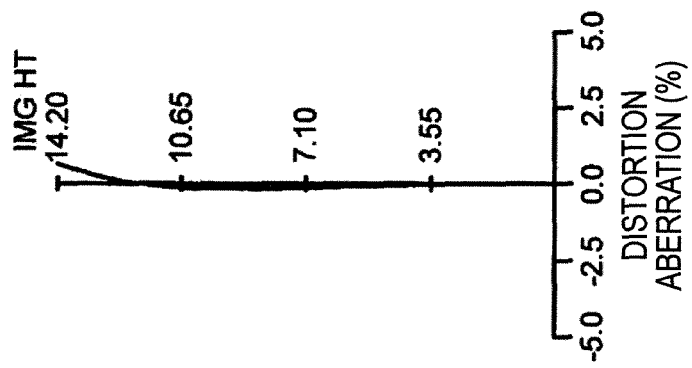

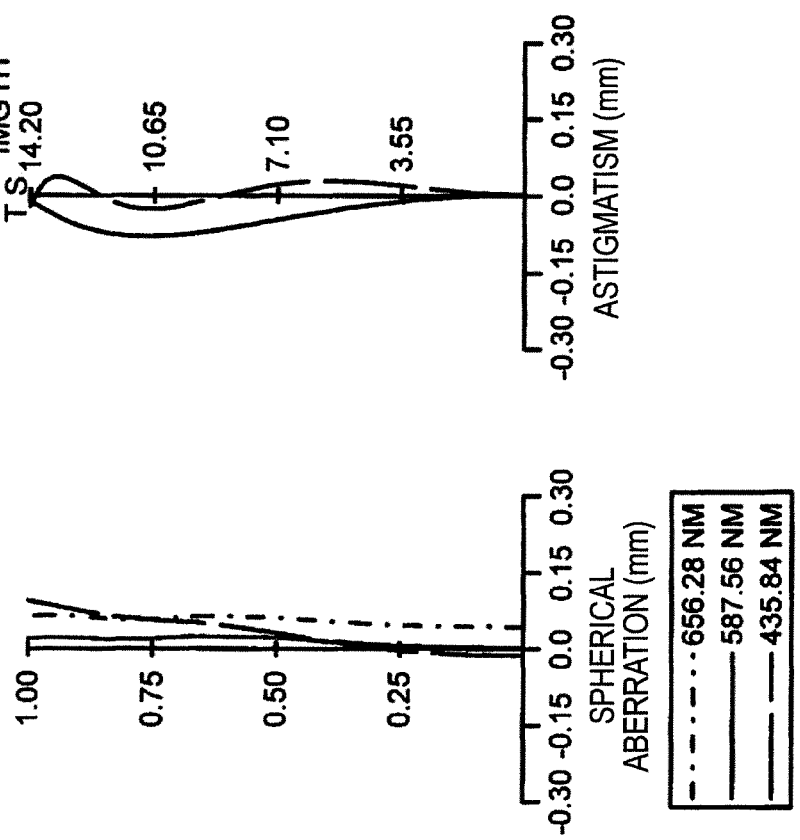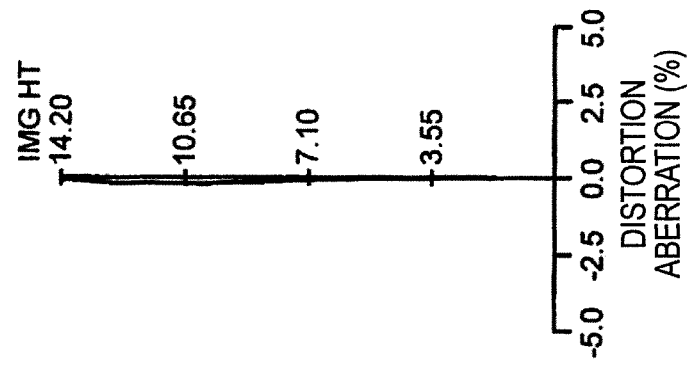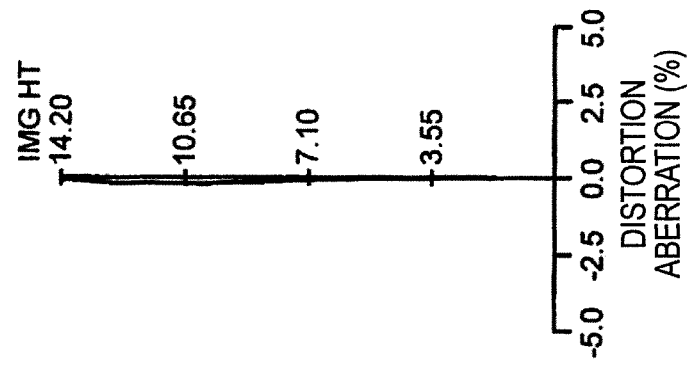

EX7-POS2

EX7-POS2

EX7-POS2

EX1-POS1
FIG. 15A — TANGENTIAL, 1.00 RELATIVE FIELD HEIGHT (21.51)°
FIG. 15F — SAGITTAL
FIG. 15B — 0.90 RELATIVE FIELD HEIGHT (19.53)°
FIG. 15G
FIG. 15C — 0.70 RELATIVE FIELD HEIGHT (15.43)°
FIG. 15H
FIG. 15D — 0.50 RELATIVE FIELD HEIGHT (11.15)°
FIG. 15I
FIG. 15E — 0.00 RELATIVE FIELD HEIGHT (0.000)°
FIG. 15J
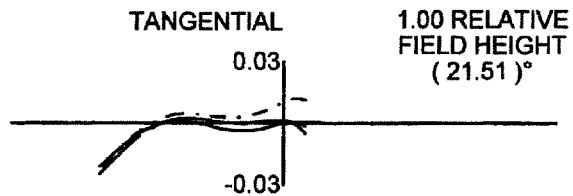
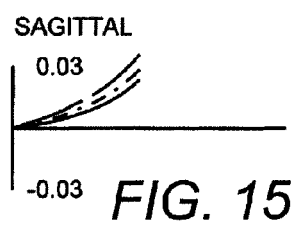
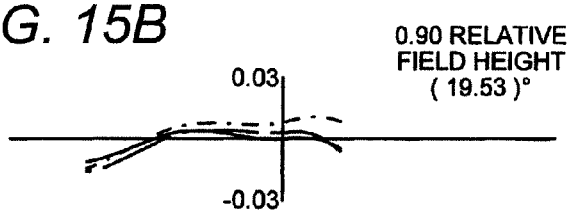
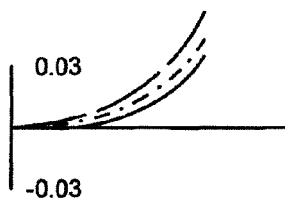
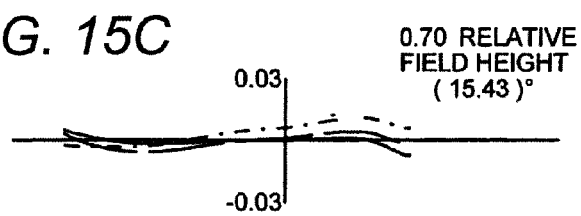
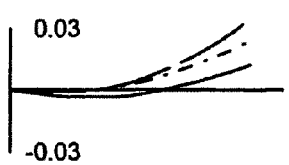
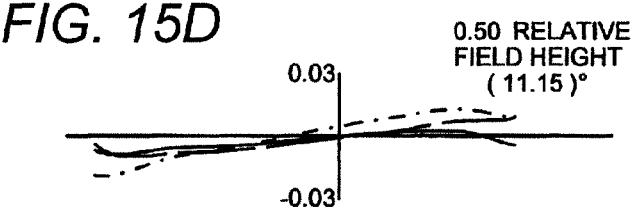
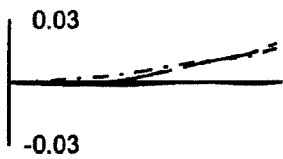
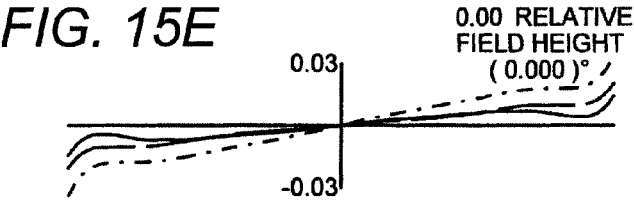
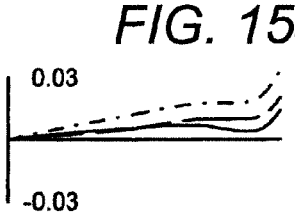
— · — · — 656.28 NM
———— 587.56 NM
— — — 435.84 NM EX1-POS2
FIG. 16A — TANGENTIAL, 1.00 RELATIVE FIELD HEIGHT (21.27)°
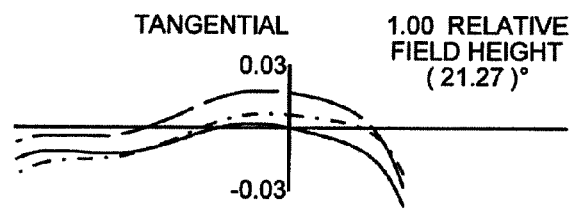
FIG. 16F — SAGITTAL
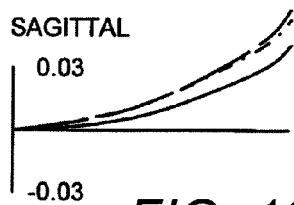
FIG. 16B — 0.90 RELATIVE FIELD HEIGHT (19.31)°
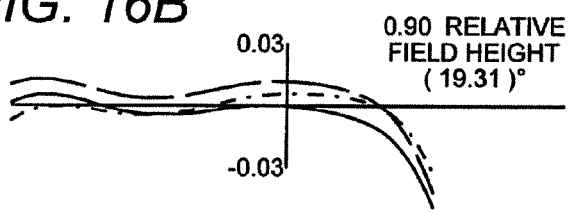
FIG. 16G
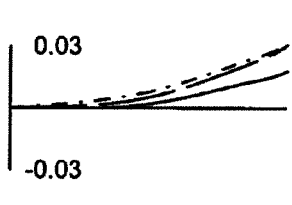
FIG. 16C — 0.70 RELATIVE FIELD HEIGHT (15.26)°
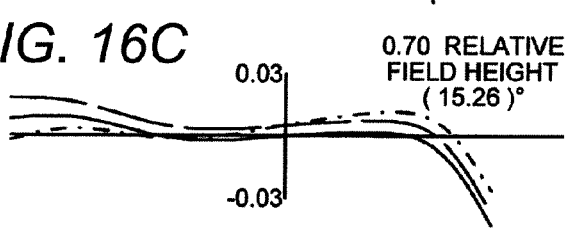
FIG. 16H
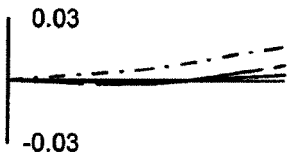
FIG. 16D — 0.50 RELATIVE FIELD HEIGHT (11.03)°
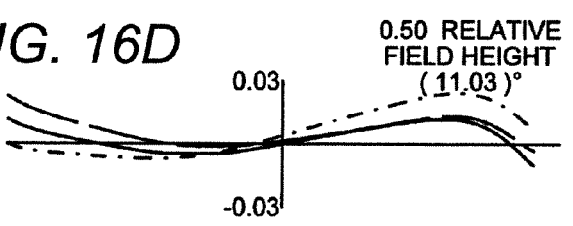
FIG. 16I
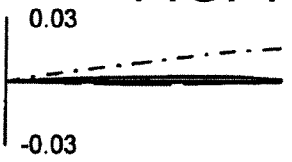
FIG. 16E — 0.00 RELATIVE FIELD HEIGHT (0.000)°
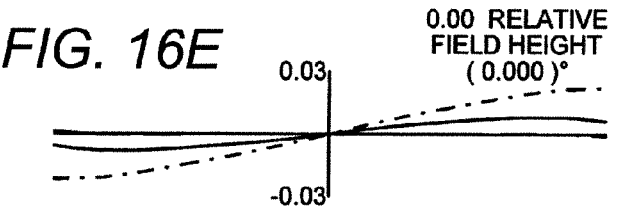
FIG. 16J
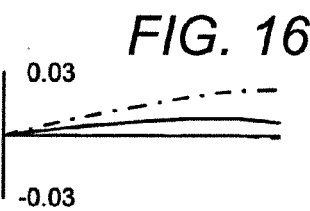
— · — · — 656.28 NM
———— 587.56 NM
— — — 435.84 NM EX2-POS1
FIG. 17A — TANGENTIAL, 1.00 RELATIVE FIELD HEIGHT (22.42)°
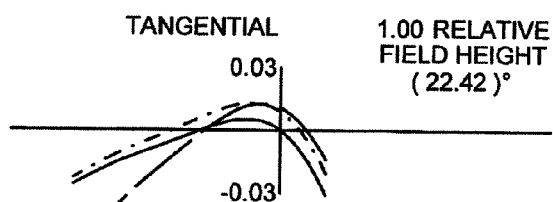
FIG. 17F — SAGITTAL
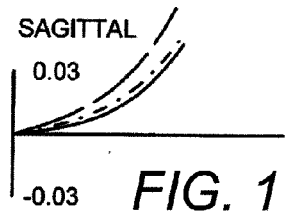
FIG. 17B — 0.90 RELATIVE FIELD HEIGHT (20.37)°
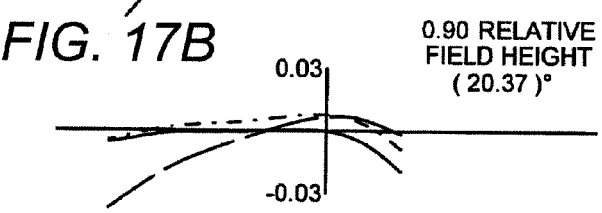
FIG. 17G
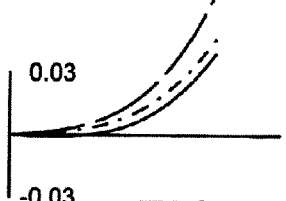
FIG. 17C — 0.70 RELATIVE FIELD HEIGHT (16.11)°
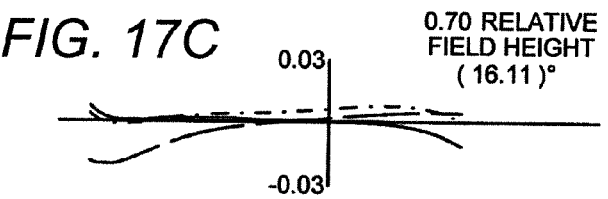
FIG. 17H
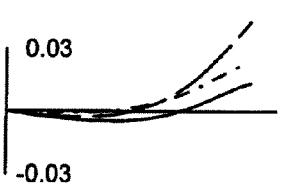
FIG. 17D — 0.50 RELATIVE FIELD HEIGHT (11.66)°
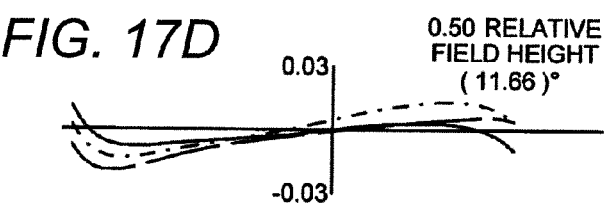
FIG. 17I
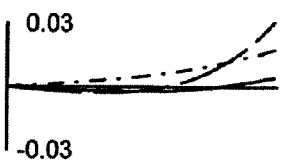
FIG. 17E — 0.00 RELATIVE FIELD HEIGHT (0.000)°
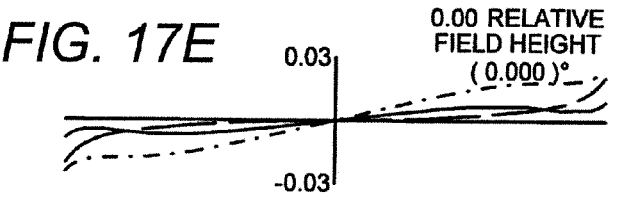
FIG. 17J
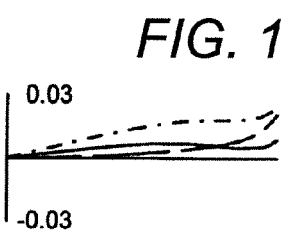
- – · – · – 656.28 NM
- ———— 587.56 NM
- – – – – 435.84 NM EX2-POS2
FIG. 18A — TANGENTIAL — 1.00 RELATIVE FIELD HEIGHT (22.06)°
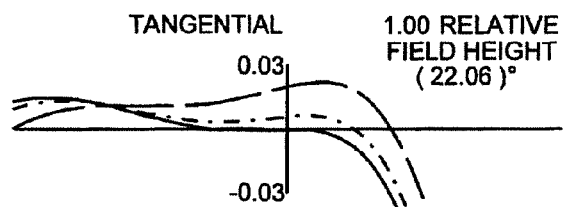
FIG. 18F — SAGITTAL
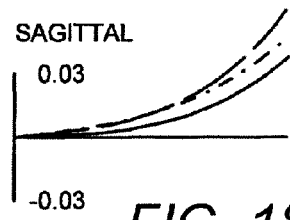
FIG. 18B — 0.90 RELATIVE FIELD HEIGHT (20.04)°
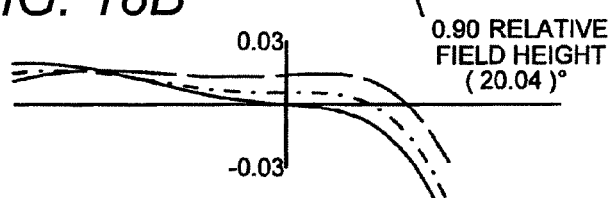
FIG. 18G
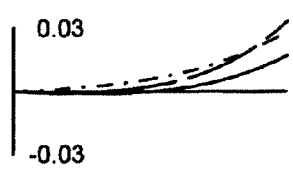
FIG. 18C — 0.70 RELATIVE FIELD HEIGHT (15.84)°
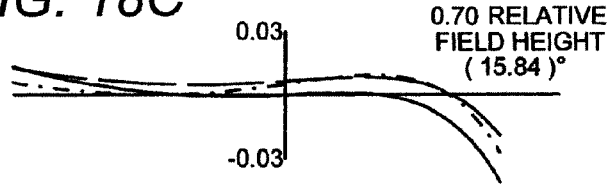
FIG. 18H
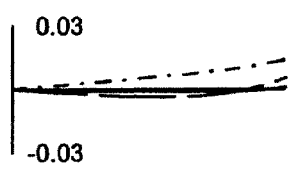
FIG. 18D — 0.50 RELATIVE FIELD HEIGHT (11.46)°
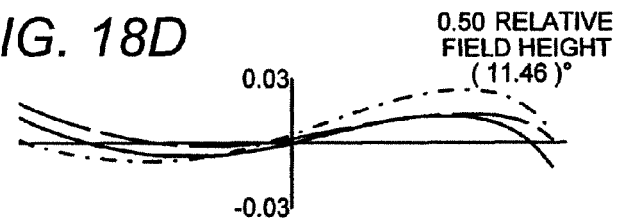
FIG. 18I
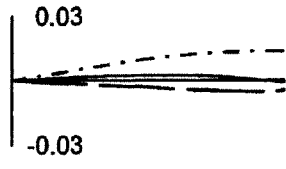
FIG. 18E — 0.00 RELATIVE FIELD HEIGHT (0.000)°
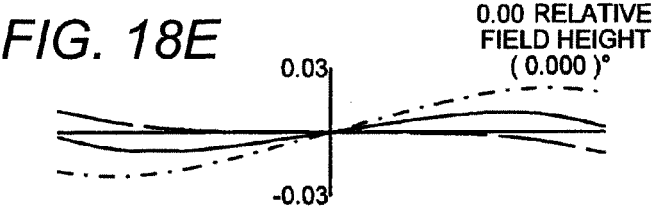
FIG. 18J
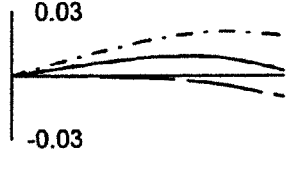
— · — · — 656.28 NM
———— 587.56 NM
— — — 435.84 NM

EX3-POS1

TANGENTIAL 1.00 RELATIVE FIELD HEIGHT (21.79)°

SAGITTAL 0.90 RELATIVE FIELD HEIGHT (19.79)°

0.70 RELATIVE FIELD HEIGHT (15.63)°

0.50 RELATIVE FIELD HEIGHT (11.30)°

0.00 RELATIVE FIELD HEIGHT (0.000)°

- — - — - 656.28 NM
———— 587.56 NM
— — — 435.84 NM

EX3-POS2

TANGENTIAL 1.00 RELATIVE FIELD HEIGHT (21.45)°

SAGITTAL 0.90 RELATIVE FIELD HEIGHT (19.47)°

0.70 RELATIVE FIELD HEIGHT (15.38)°

0.50 RELATIVE FIELD HEIGHT (11.12)°

0.00 RELATIVE FIELD HEIGHT (0.000)°

— · — · — 656.28 NM
———— 587.56 NM
— — — 435.84 NM

EX4-POS1
FIG. 21A — TANGENTIAL, 1.00 RELATIVE FIELD HEIGHT (22.42)°
FIG. 21F — SAGITTAL
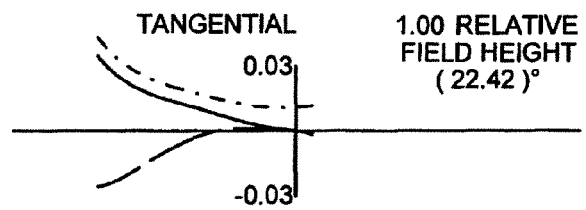
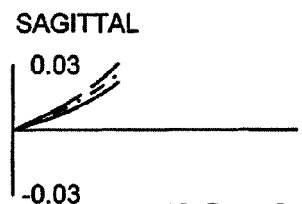
FIG. 21B — 0.90 RELATIVE FIELD HEIGHT (20.37)°
FIG. 21G
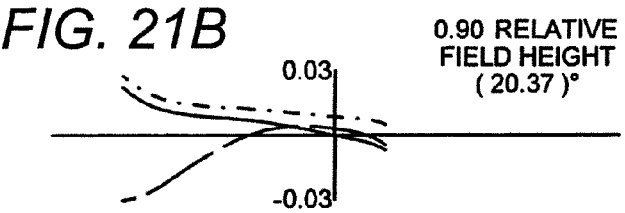
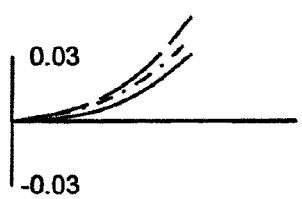
FIG. 21C — 0.70 RELATIVE FIELD HEIGHT (16.11)°
FIG. 21H
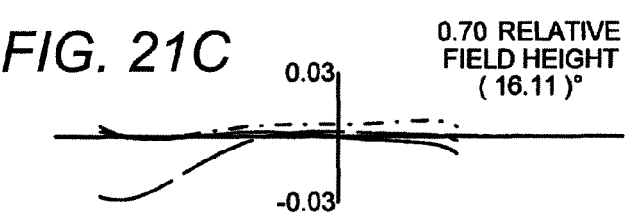
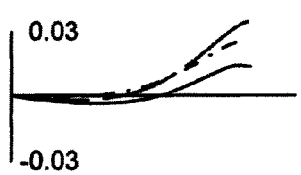
FIG. 21D — 0.50 RELATIVE FIELD HEIGHT (11.66)°
FIG. 21I
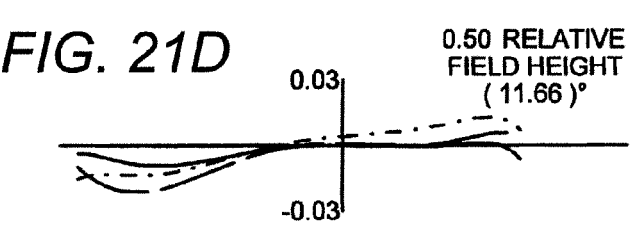
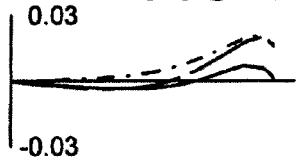
FIG. 21E — 0.00 RELATIVE FIELD HEIGHT (0.000)°
FIG. 21J
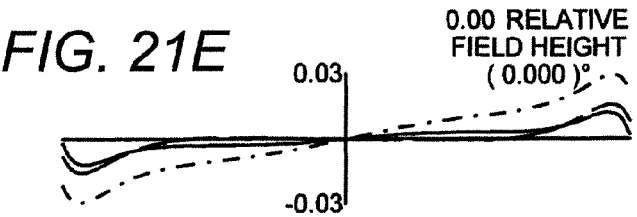
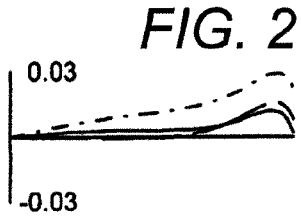
— · — · — 656.28 NM
————— 587.56 NM
— — — 435.84 NM FIG. 22A
EX4-POS2
FIG. 22F
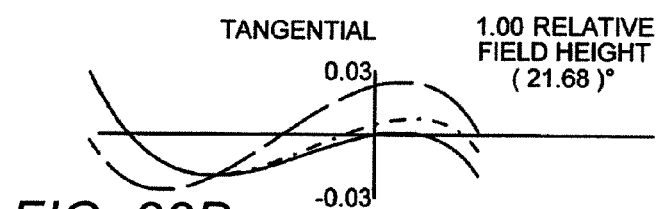
TANGENTIAL — 1.00 RELATIVE FIELD HEIGHT (21.68)° — SAGITTAL
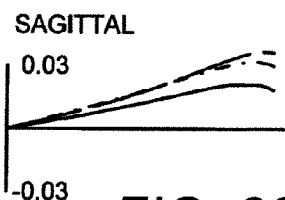
FIG. 22B
FIG. 22G
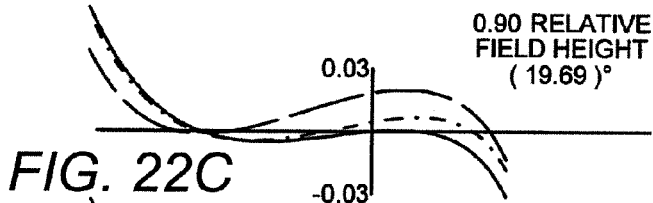
0.90 RELATIVE FIELD HEIGHT (19.69)°
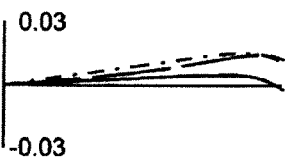
FIG. 22C
FIG. 22H
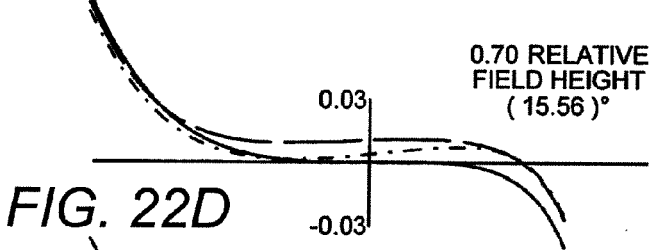
0.70 RELATIVE FIELD HEIGHT (15.56)°
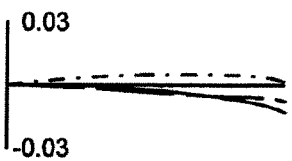
FIG. 22D
FIG. 22I
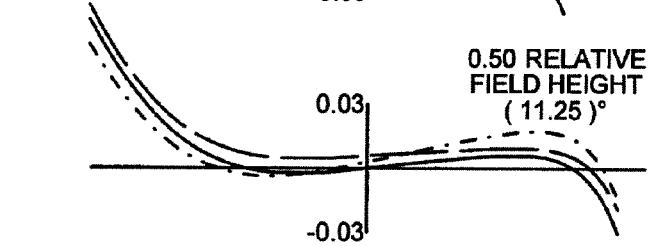
0.50 RELATIVE FIELD HEIGHT (11.25)°
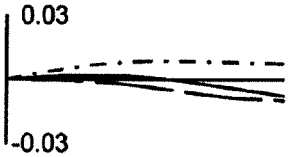
FIG. 22E
FIG. 22J
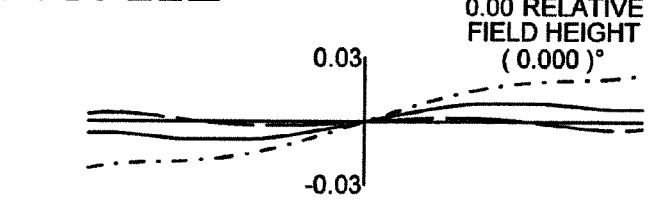
0.00 RELATIVE FIELD HEIGHT (0.000)°
— · — · — 656.28 NM
——— 587.56 NM
— — — 435.84 NM EX5-POS1
FIG. 23A  TANGENTIAL  1.00 RELATIVE FIELD HEIGHT (22.42)°  FIG. 23F  SAGITTAL
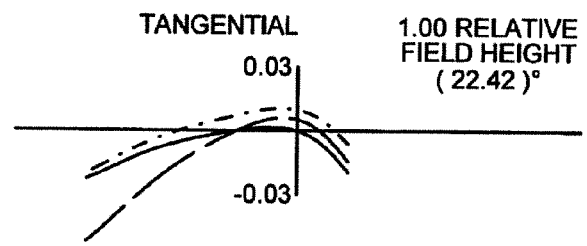
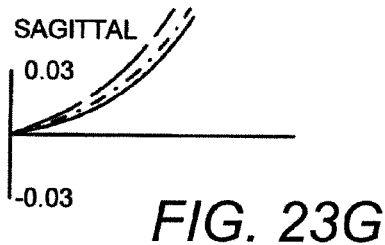
FIG. 23B  0.90 RELATIVE FIELD HEIGHT (20.37)°  FIG. 23G
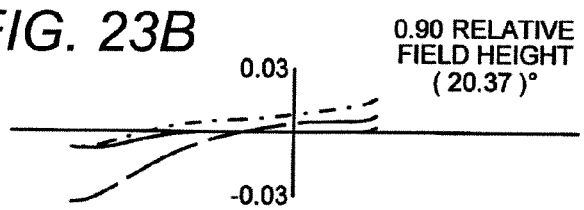
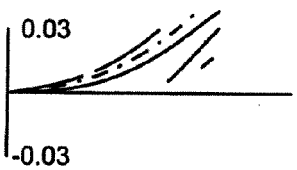
FIG. 23C  0.70 RELATIVE FIELD HEIGHT (16.11)°  FIG. 23H
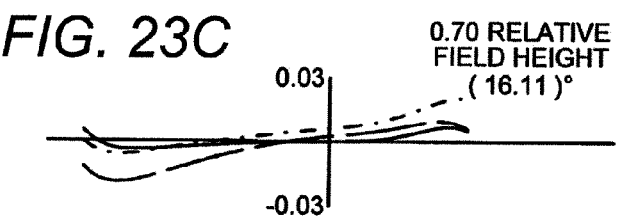
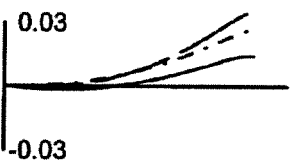
FIG. 23D  0.50 RELATIVE FIELD HEIGHT (11.66)°  FIG. 23I
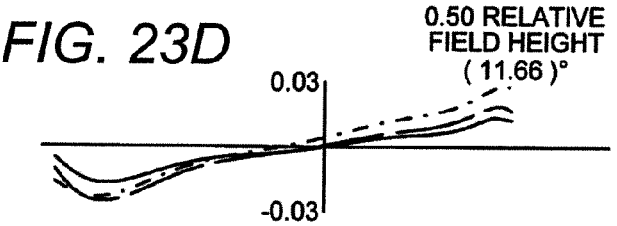
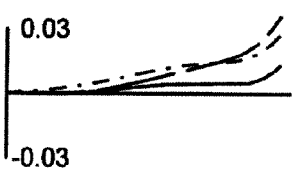
FIG. 23E  0.00 RELATIVE FIELD HEIGHT (0.000)°  FIG. 23J
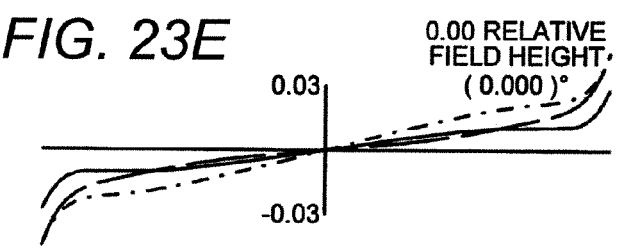
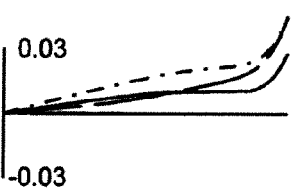
— · — · — 656.28 NM
———— 587.56 NM
— — — 435.84 NM EX5-POS2
FIG. 24A
TANGENTIAL 1.00 RELATIVE FIELD HEIGHT (21.96)°
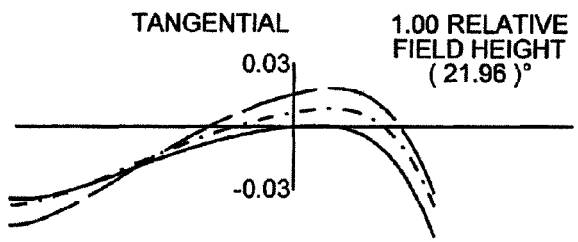
FIG. 24F
SAGITTAL
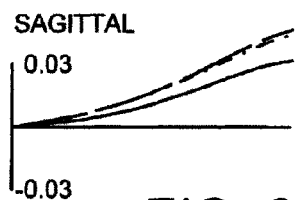
FIG. 24B
0.90 RELATIVE FIELD HEIGHT (19.95)°
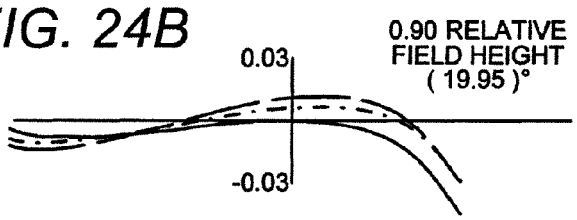
FIG. 24G
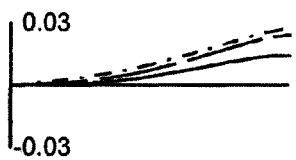
FIG. 24C
0.70 RELATIVE FIELD HEIGHT (15.77)°
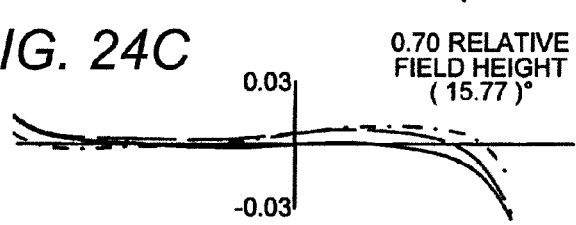
FIG. 24H
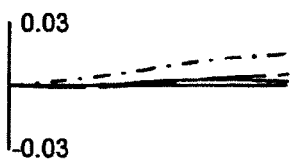
FIG. 24D
0.50 RELATIVE FIELD HEIGHT (11.41)°
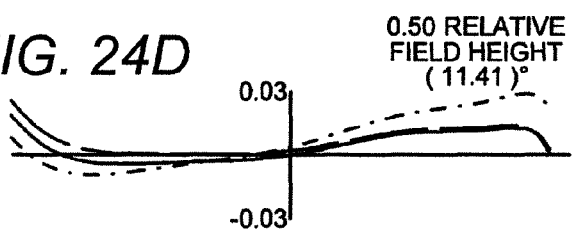
FIG. 24I
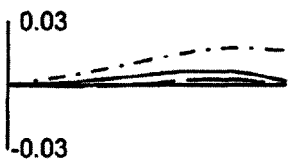
FIG. 24E
0.00 RELATIVE FIELD HEIGHT (0.000)°
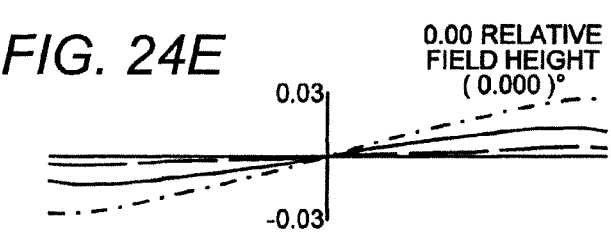
FIG. 24J
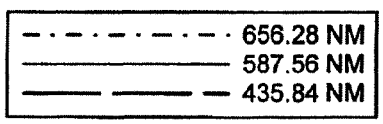

FIG. 25A — EX6-POS1 — TANGENTIAL, 1.00 RELATIVE FIELD HEIGHT (22.42)°
FIG. 25F — SAGITTAL
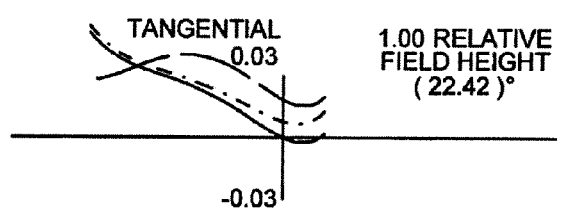
FIG. 25B — 0.90 RELATIVE FIELD HEIGHT (20.37)°
FIG. 25G
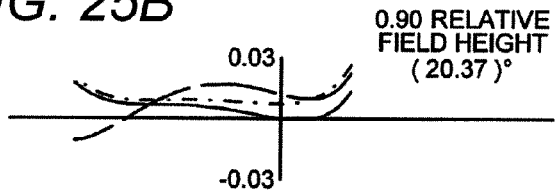
FIG. 25C — 0.70 RELATIVE FIELD HEIGHT (16.11)°
FIG. 25H
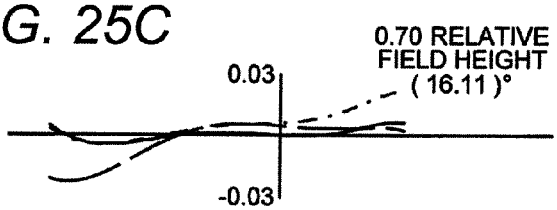
FIG. 25D — 0.50 RELATIVE FIELD HEIGHT (11.65)°
FIG. 25I
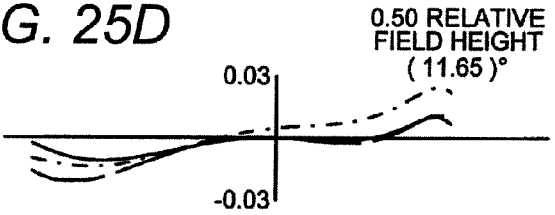
FIG. 25E — 0.00 RELATIVE FIELD HEIGHT (0.000)°
FIG. 25J
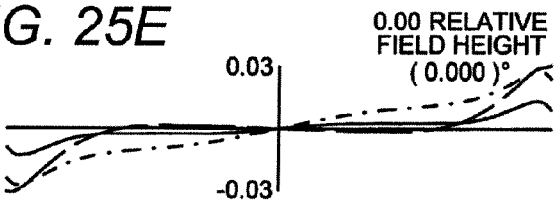
- – · – · – 656.28 NM
- ——— 587.56 NM
- – – – – 435.84 NM EX6-POS2
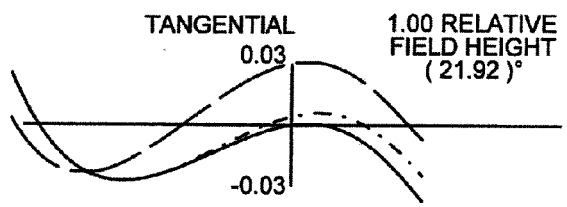
FIG. 26A
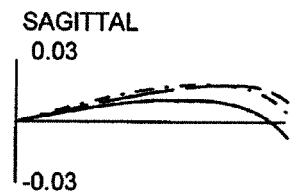
FIG. 26F
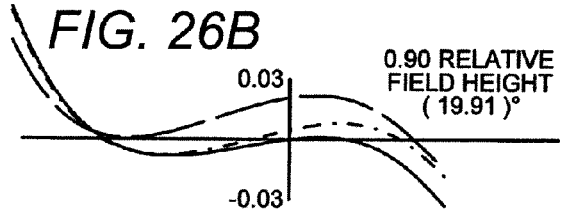
FIG. 26B
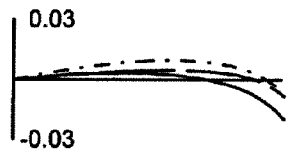
FIG. 26G
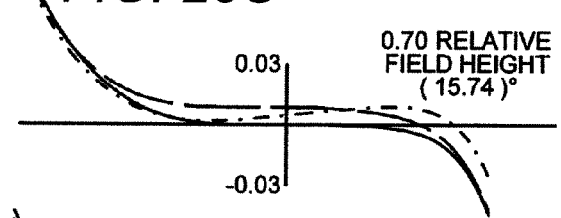
FIG. 26C
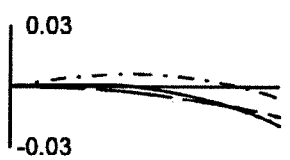
FIG. 26H
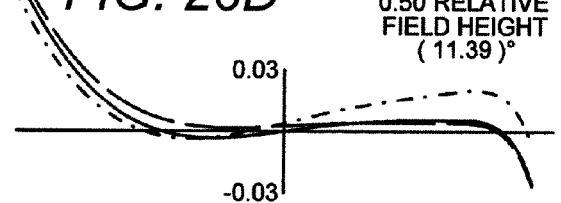
FIG. 26D
FIG. 26I
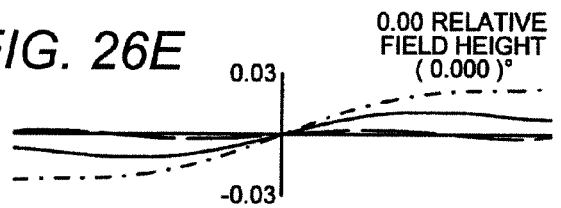
FIG. 26E
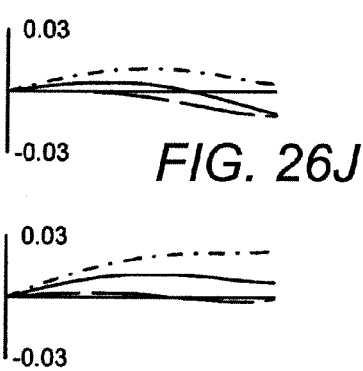
FIG. 26J
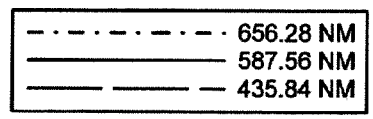

EX7-POS1
FIG. 27A — TANGENTIAL — 1.00 RELATIVE FIELD HEIGHT (21.52)°
FIG. 27F — SAGITTAL
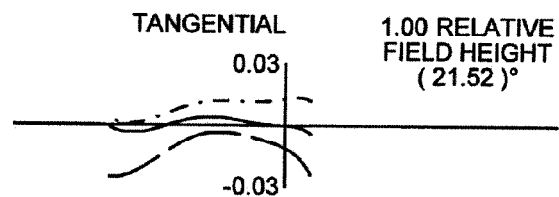
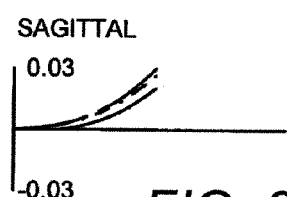
FIG. 27B — 0.90 RELATIVE FIELD HEIGHT (19.54)°
FIG. 27G
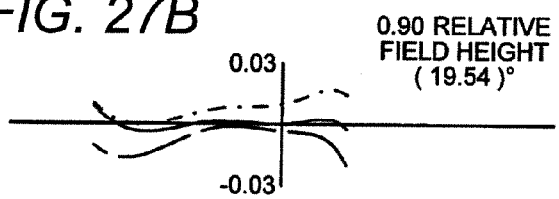
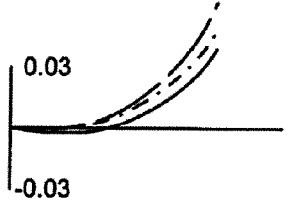
FIG. 27C — 0.70 RELATIVE FIELD HEIGHT (15.43)°
FIG. 27H
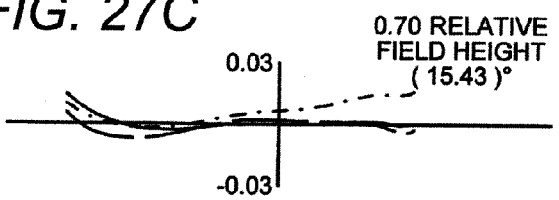
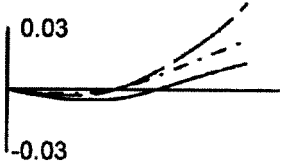
FIG. 27D — 0.50 RELATIVE FIELD HEIGHT (11.15)°
FIG. 27I
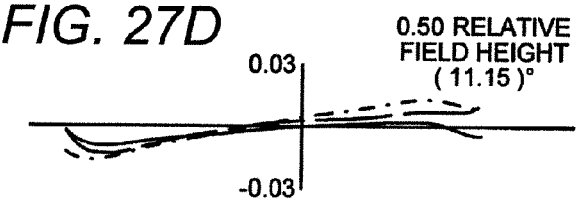
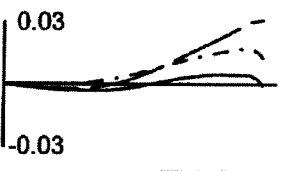
FIG. 27E — 0.00 RELATIVE FIELD HEIGHT (0.000)°
FIG. 27J
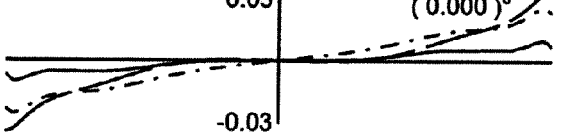
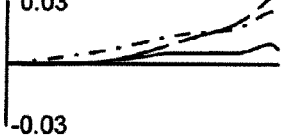
- — - — 656.28 NM
——— 587.56 NM
— — — 435.84 NM

EX7-POS2

IMAGE-CAPTURING OPTICAL SYSTEM, IMAGE-CAPTURING OPTICAL APPARATUS AND DIGITAL DEVICE

The entire disclosure of Japanese Patent Application No. 2014-092429 filed on Apr. 28, 2014 including description, claims, drawings, and abstract are incorporated herein by reference in its entirety.

BACKGROUND OF THE INVENTION

Field of the Invention

The present invention relates to an image-capturing optical system, an image-capturing optical apparatus, and a digital device. For example, the present invention relates to: a compact, large-aperture and internal-focus image-capturing optical system that is suitable for an interchangeable lens digital camera that captures an image of a subject with an image-capturing element (for example, a solid image-capturing element such as a Charge Coupled Device (CCD) image sensor, or a Complementary Metal-Oxide Semiconductor (CMOS) image sensor); an image-capturing optical apparatus that outputs the image of the subject captured with the image-capturing optical system and the image-capturing element as an electric signal; and a digital device with an image input function, such as a digital camera, on which the image-capturing optical apparatus is installed.

Description of the Related Art

The market for mirror-less interchangeable lens cameras, which are single-lens reflex cameras from which the jump-up mirror is removed, is expanding because the users accept the compact designs of the cameras. Some of such mirror-less interchangeable lens cameras fail to use phase difference autofocus (AF) that is mainly used in conventional single-lens reflex cameras. Such cameras accordingly use contrast AF in which the camera focuses by scanning the focus group (focusing group) and finding a place for maximum contrast.

In such cameras, the weight of the focus group may be a problem. In the phase difference AF, the travel distance of the focus group required to bring the camera into focus can be calculated using the information from an AF sensor and thus the focus group can move in accordance with the calculated distance. On the other hand, in the contrast AF, the information from the AF sensor includes only the contrast value of the moment. Thus, the camera moves the focus group and reads the variations in contrast during the movement to find a place for maximum contrast and bring the camera into focus. Consequently, the travel distance of the focus group required to bring the camera into focus in the contrast AF is predominantly longer than that in the phase difference AF.

In light of the foregoing, reducing the weight of the focus group is an important point for an image-capturing optical system using contrast AF (for example, see JP 2013-182024 A1 and JP 2013-186458 A1).

The image-capturing optical system disclosed in JP 2013-182024 A1 includes two positive groups and moves the second lens group toward the object side for focusing. However, the second lens group includes four lenses that are a positive lens, a negative lens, a positive lens, and a positive lens. Thus, the weight reduction is not enough to perform the contrast AF. Similarly, the optical system described in JP 2013-186458 A1 includes a first positive lens group and a positive second lens group between which a diaphragm is placed, and moves the second lens group toward the object side for focusing. However, the second lens group includes a lens with a large weight. Thus, the weight reduction of the second lens group is not enough to perform the contrast AF.

SUMMARY OF THE INVENTION

In light of the foregoing, an object of the present invention is to provide a small and high-performance internal focus image-capturing optical system that includes a lightweight focus group while including a large-aperture lens, and an image-capturing optical apparatus that includes the internal focus image-capturing optical system, and a digital device with the image-capturing optical apparatus.

To achieve the abovementioned object, according to an aspect, an image-capturing optical system reflecting one aspect of the present invention comprises: a positive first lens group; and a positive second lens group, wherein the positive first lens group and the positive second lens group are arranged in order from an object side in the image-capturing optical system, the image-capturing optical system focuses on a close object by moving the second lens group as a whole along a light axis toward the object side, a lens closest to the object side in the second lens group has a convex surface facing the object side, a lens closest to an image side in the second lens group is a positive meniscus lens having a convex surface facing the image side, the image-capturing optical system satisfies following condition expressions (1) to (3)

$$2.2 < 1Gr\_Fl/FL < 3.8 \tag{1}$$

$$0.9 < 2Gr\_Fl/FL < 1.5 \tag{2), and}$$

$$0.45 < 1Gr\_R\_nop/1Gr\_Thi < 0.85 \tag{3}$$

the FL indicates a focal length of the image-capturing optical system, the 1Gr_Fl indicates a focal length of the first lens group, the 2Gr_Fl indicates a focal length of the second lens group, the 1Gr_R_nop indicates a distance from a surface closest to the object side to a position of a back principal point in the first lens group, and the 1Gr_Thi indicates a whole length of the first lens group.

In the image-capturing optical system of Item. 2 according to the image-capturing optical system of Item. 1, the lens closest to the object side in the second lens group preferably has a positive power.

In the image-capturing optical system of Item. 3 according to the image-capturing optical system of Item. 1 or 2, a following condition expression (4)

$$0.7 < 2Gr\_R\_Fl/2Gr\_Fl < 2.5 \tag{4}$$

wherein the 2Gr_R_Fl indicates a focal length of the positive lens placed closest to the image side in the second lens group is preferably satisfied.

In the image-capturing optical system of Item. 4 according to the image-capturing optical system of any one of Items. 1 to 3, the positive lens closest to the image side in the second lens group preferably has an aspheric shape.

In the image-capturing optical system of Item. 5 according to the image-capturing optical system of any one of Items. 1 to 4, the image-capturing optical system preferably further comprises a diaphragm in the first lens group.

In the image-capturing optical system of Item. 6 according to the image-capturing optical system of any one of Items. 1 to 5, a lens closest to the image side in the first lens group preferably has a convex surface facing the image-surface.

In the image-capturing optical system of Item. 7 according to the image-capturing optical system of any one of Items. 3 to 6, a following condition expression (5)

$$W\_2Gr<25 \quad (5)$$

wherein the W_2Gr indicates a total weight (g) of lens elements included in the second lens group is preferably satisfied.

In the image-capturing optical system of Item. 8 according to the image-capturing optical system of any one of Items. 3 to 7, the image-capturing optical system is preferably configured to form an optical image of a subject on an image-capturing surface of an image-capturing element and a following condition expression (6)

$$20<\arctan(y\_max/FL)<25 \quad (6)$$

wherein the y_max indicates a maximum image height, the FL indicates a focal length of the image-capturing optical system, and a diagonal length of a screen size of the image-capturing surface is 2y_max is preferably satisfied.

An image-capturing optical apparatus of Item. 9 preferably comprises: the image-capturing optical system of any one of Items. 1 to 8; and an image-capturing element configured to convert an optical image formed on an image-capturing surface into an electric signal, wherein the image-capturing optical system is provided in the image-capturing optical apparatus so as to form an optical image of a subject on the image-capturing surface of the image-capturing element.

A digital device of Item. 10 preferably includes at least one of a function for shooting a still image of a subject and a function for shooting a movie of a subject by including the image-capturing optical apparatus of Item. 9.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 8A to 8F are diagrams of the vertical astigmatisms in the example 1;

FIGS. 9A to 9F are diagrams of the vertical astigmatisms in the example 2;

FIGS. 10A to 10F are diagrams of the vertical astigmatisms in the example 3;

FIGS. 11A to 11F are diagrams of the vertical astigmatisms in the example 4;

FIGS. 12A to 12F are diagrams of the vertical astigmatisms in the example 5;

FIGS. 13A to 13F are diagrams of the vertical astigmatisms in the example 6;

FIGS. 14A to 14F are diagrams of the vertical astigmatisms in the example 7;

FIGS. 15A to 15J are diagrams of the horizontal astigmatisms at a first focus position in the example 1;

FIGS. 16A to 16J are diagrams of the horizontal astigmatisms at a second focus position in the example 1;

FIGS. 17A to 17J are diagrams of the horizontal astigmatisms at a first focus position in the example 2;

FIGS. 18A to 18J are diagrams of the horizontal astigmatisms at a second focus position in the example 2;

FIGS. 21A to 21J are diagrams of the horizontal astigmatisms at a first focus position in the example 4;

FIGS. 22A to 22J are diagrams of the horizontal astigmatisms at a second focus position in the example 4.

FIGS. 23A to 23J are diagrams of the horizontal astigmatisms at a first focus position in the example 5;

FIGS. 24A to 24J are diagrams of the horizontal astigmatisms at a second focus position in the example 5;

FIGS. 25A to 25J are diagrams of the horizontal astigmatisms at a first focus position in the example 6;

FIGS. 26A to 26J are diagrams of the horizontal astigmatisms at a second focus position in the example 6;

FIGS. 27A to 27J are diagrams of the horizontal astigmatisms at a first focus position in the example 7;

DESCRIPTION OF THE PREFERRED EMBODIMENTS

Figure 1:
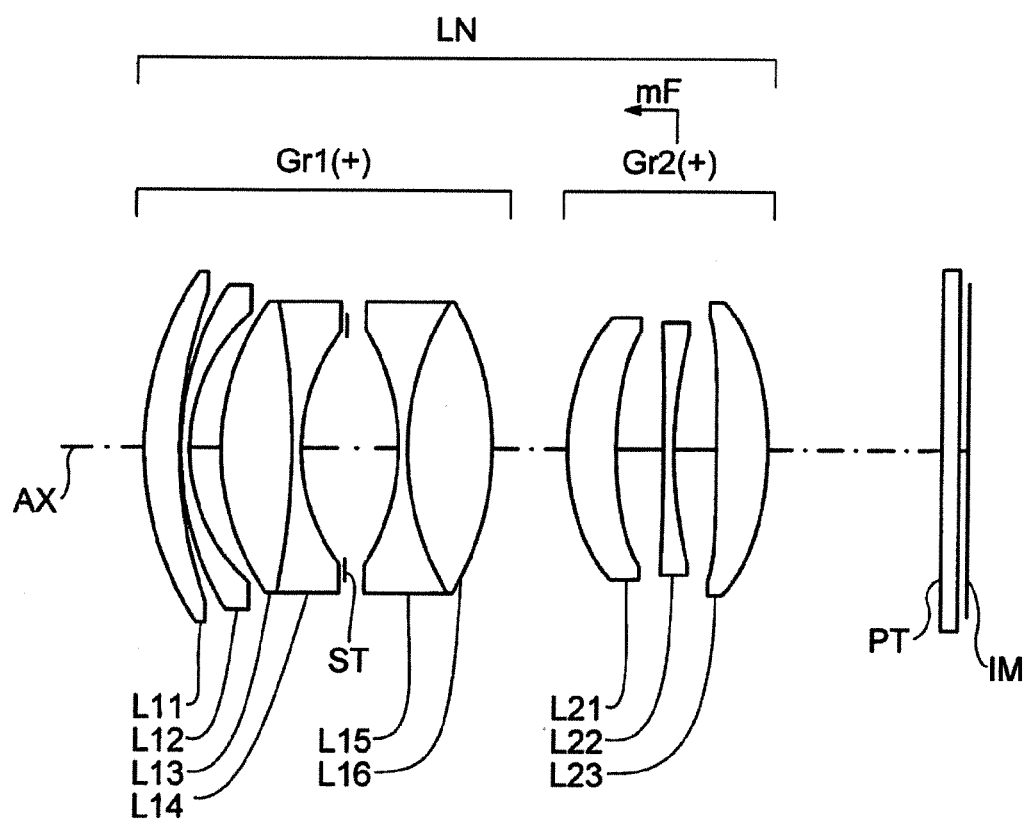
FIG. 1 is a diagram of the configuration of lenses according to a first embodiment (Example 1)
Figure 2:
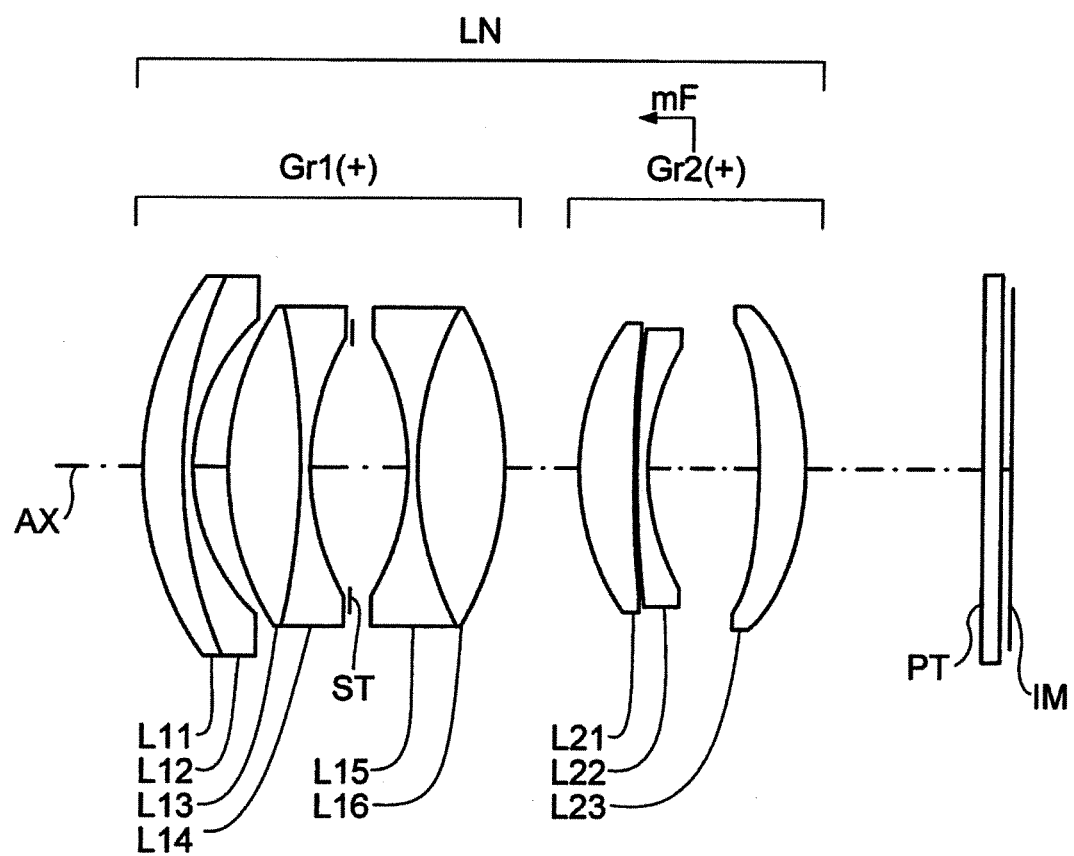
FIG. 2 is a diagram of the configuration of lenses according to a second embodiment (Example 2)
Figure 3:
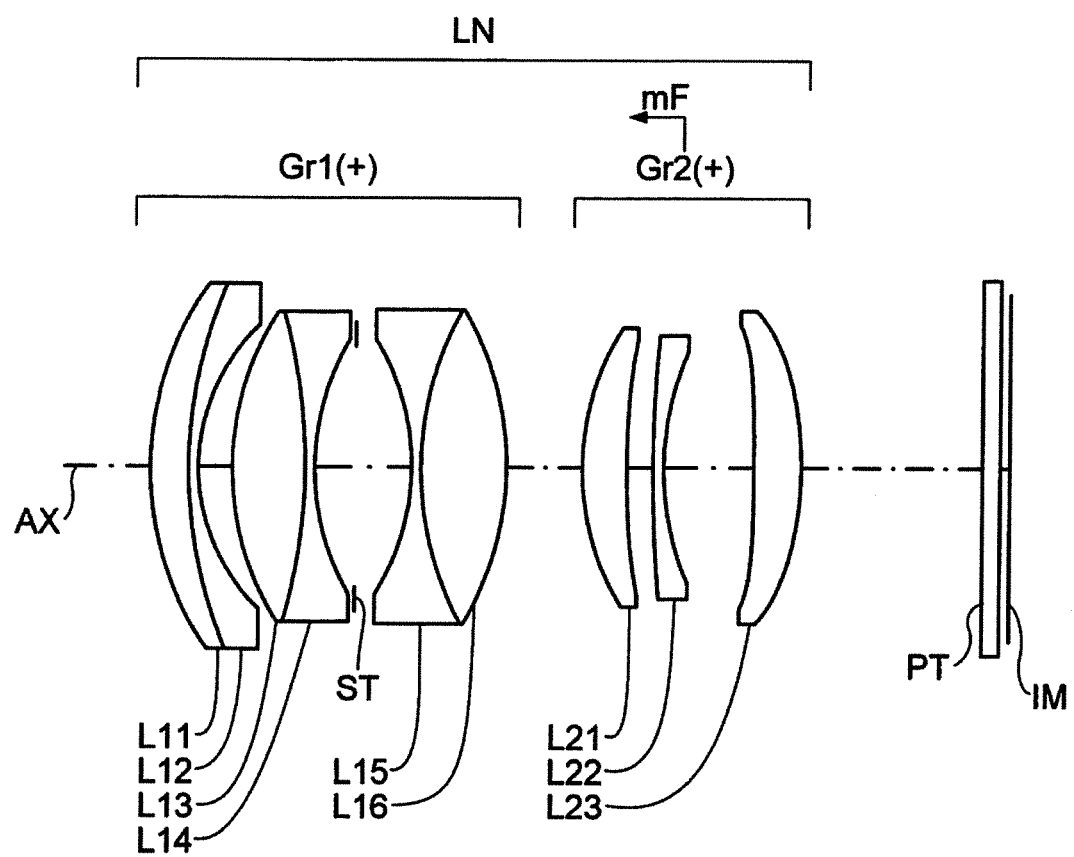
FIG. 3 is a diagram of the configuration of lenses according to a third embodiment (Example 3)
Figure 4:
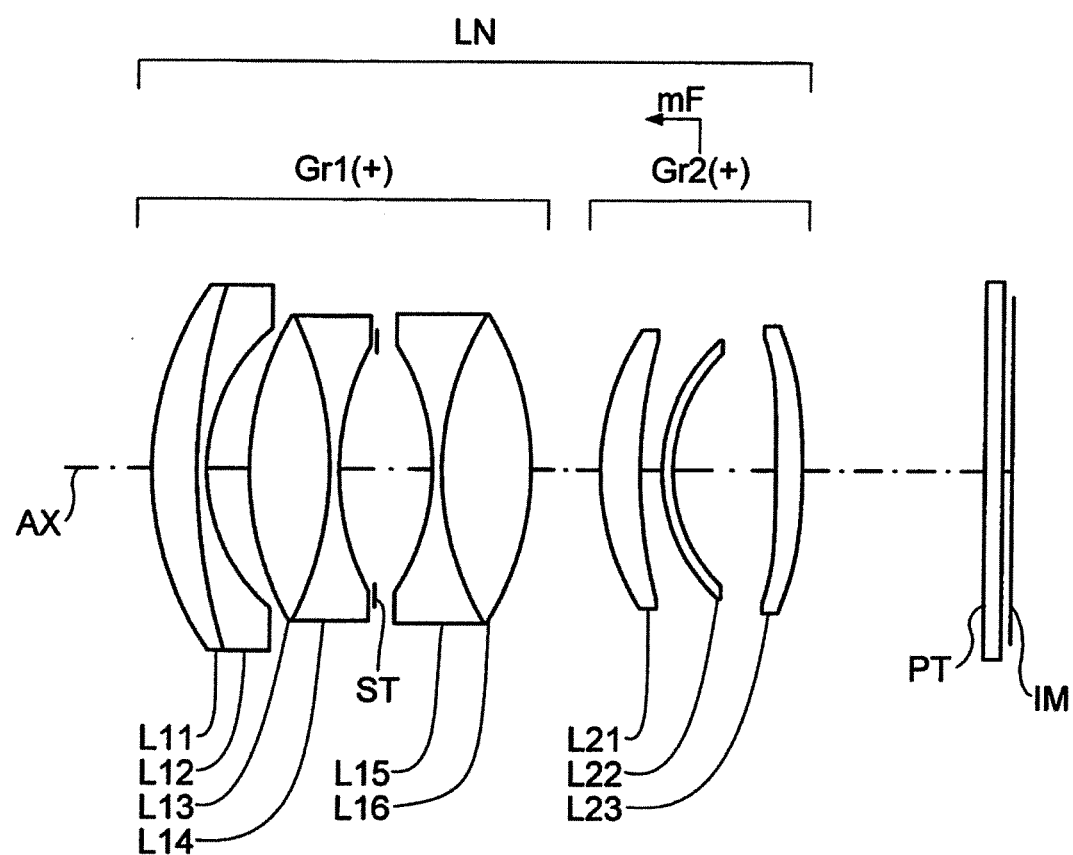
FIG. 4 is a diagram of the configuration of lenses according to a fourth embodiment (Example 4)
Figure 5:
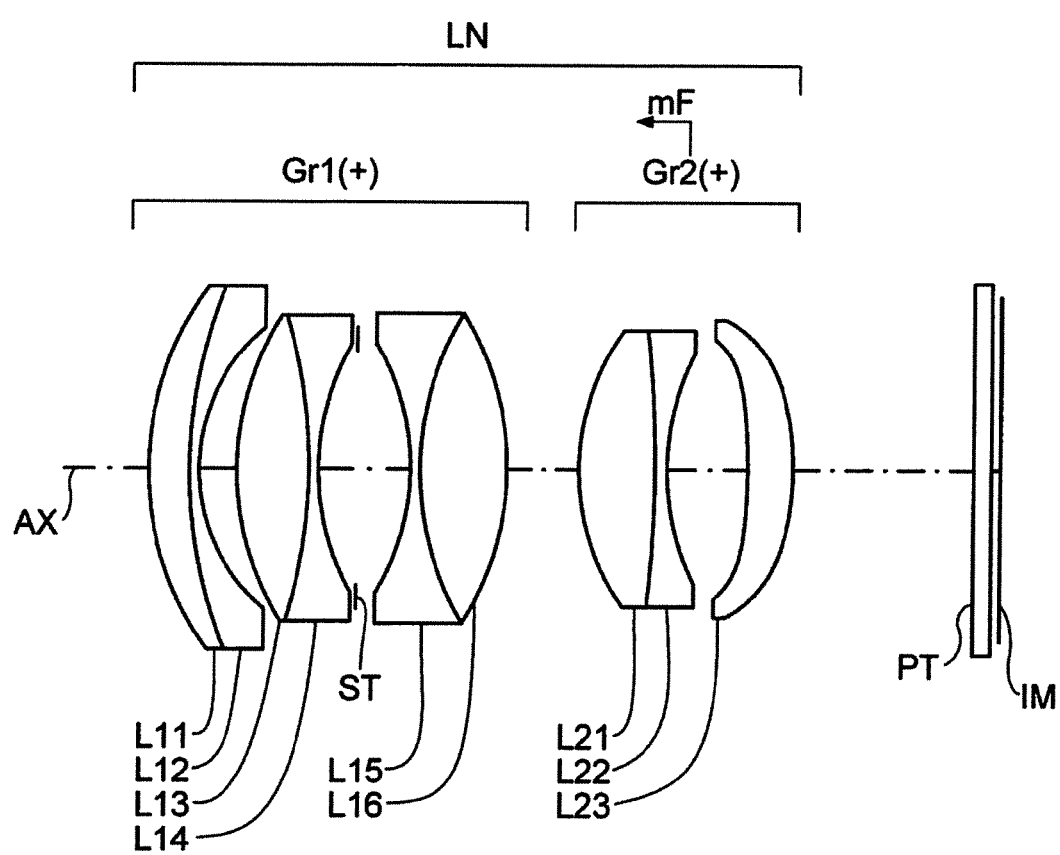
FIG. 5 is a diagram of the configuration of lenses according to a fifth embodiment (Example 5)
Figure 6:
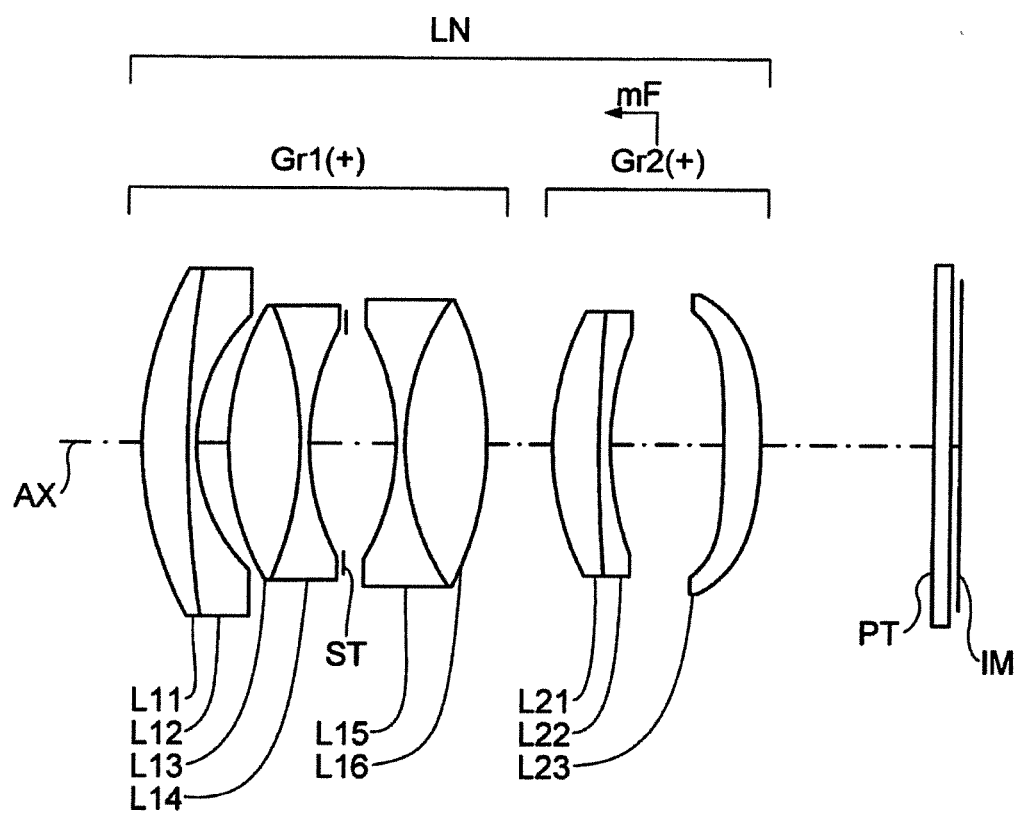
FIG. 6 is a diagram of the configuration of lenses according to a sixth embodiment (Example 6)
Figure 7:
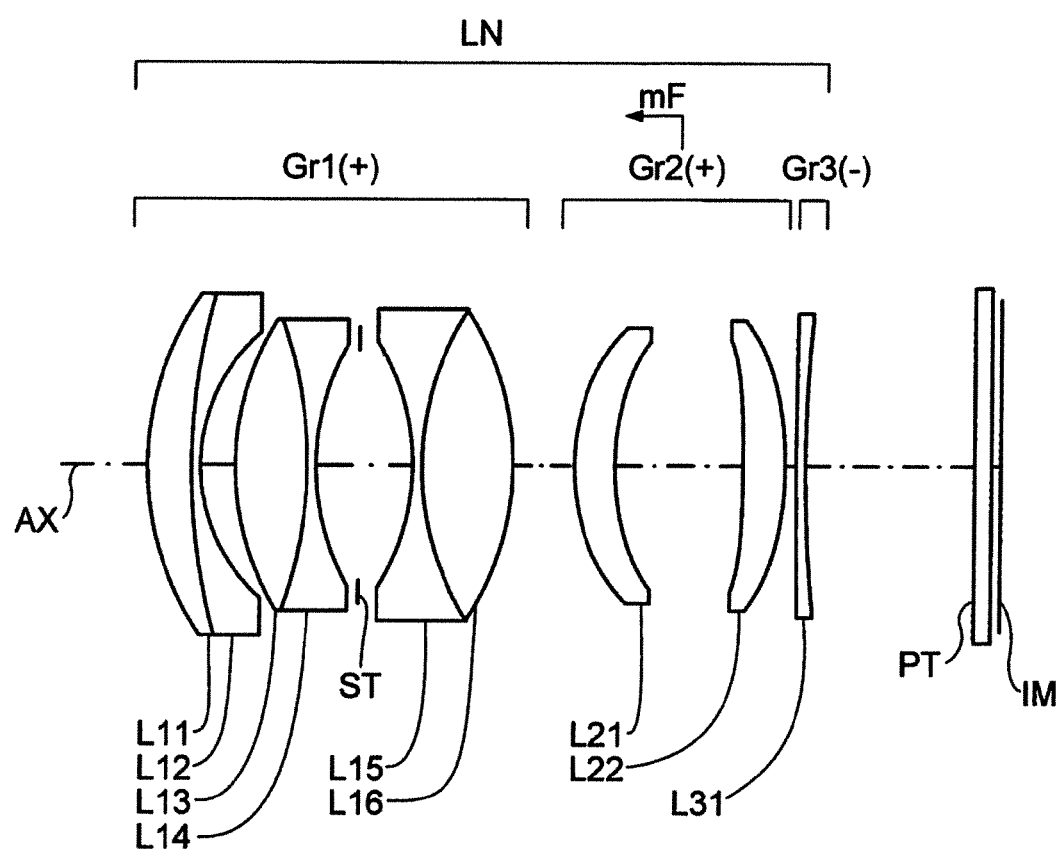
FIG. 7 is a diagram of the configuration of lenses according to a seventh embodiment (Example 7)
Figure 14D:
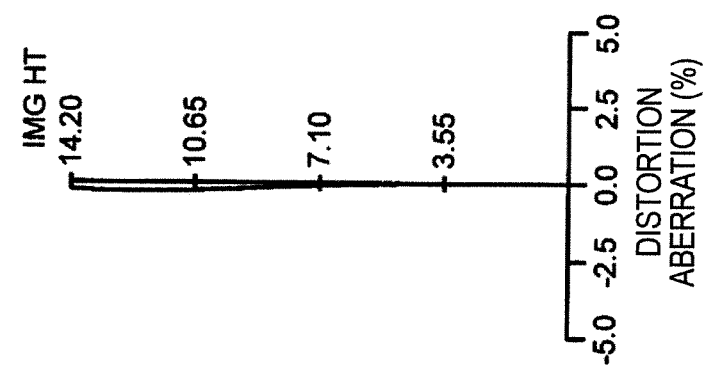
Figure 14E:
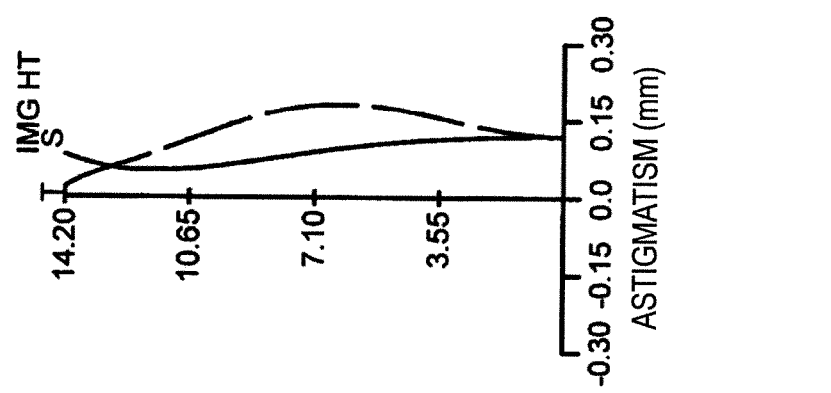
Figure 14F:
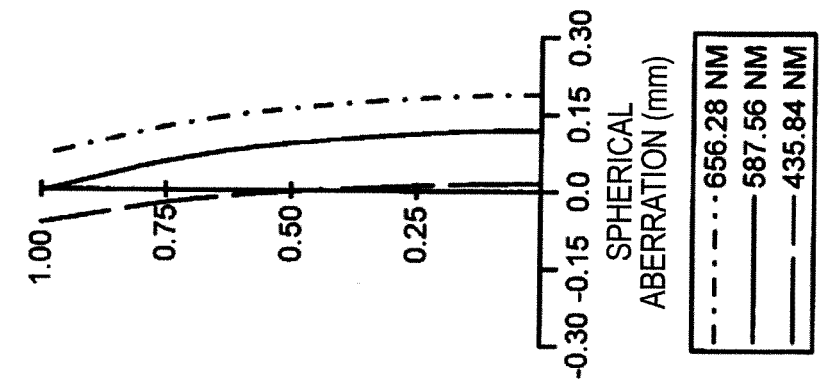
Figure 19A:
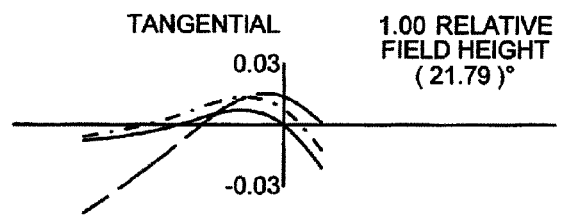
FIGS. 19A to 19J are diagrams of the horizontal astigmatisms at a first focus position in the example 3.
Figure 19F:
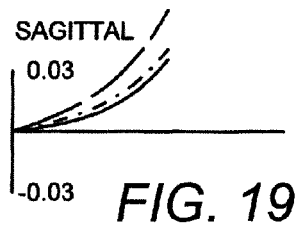
Figure 19B:
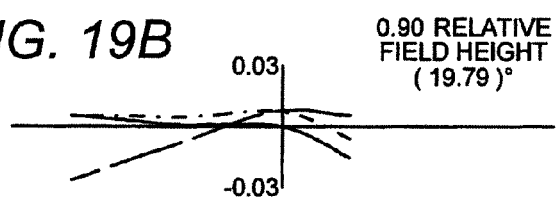
Figure 19G:
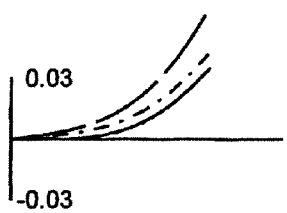
Figure 19C:
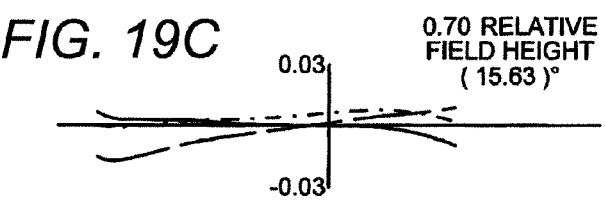
Figure 19H:
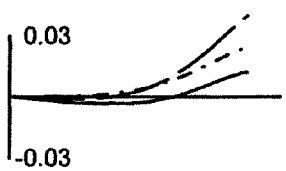
Figure 19D:
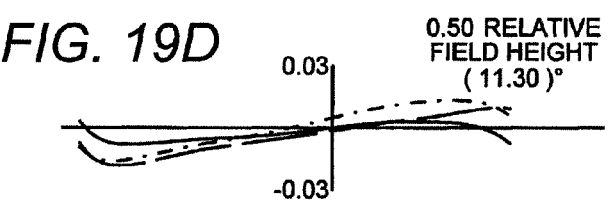
Figure 19I:
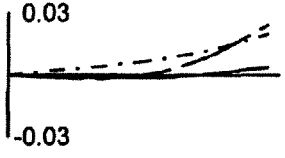
Figure 19E:
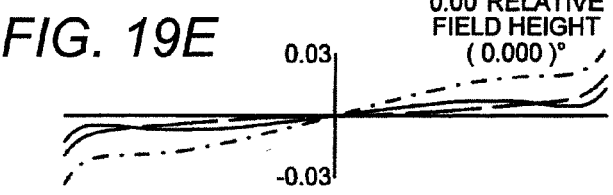
Figure 19J:
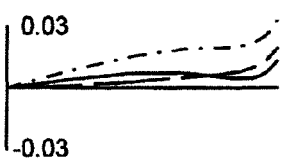
Figure 20A:
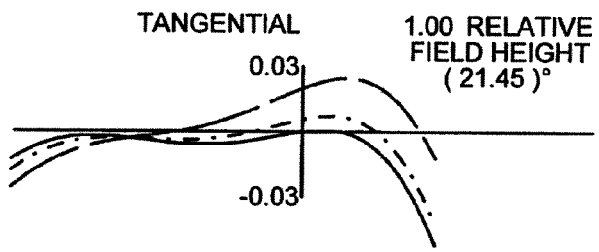
FIGS. 20A to 20J are diagrams of the horizontal astigmatisms at a second focus position in the example 3.
Figure 20F:
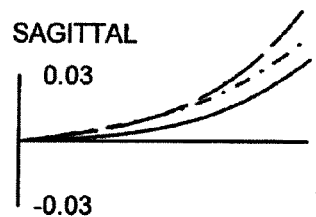
Figure 20B:
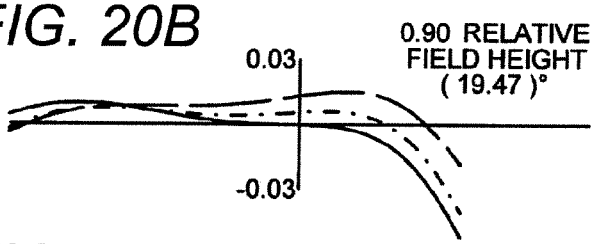
Figure 20G:
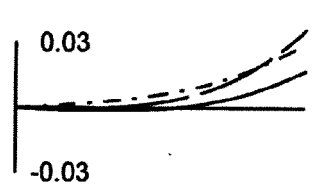
Figure 20C:
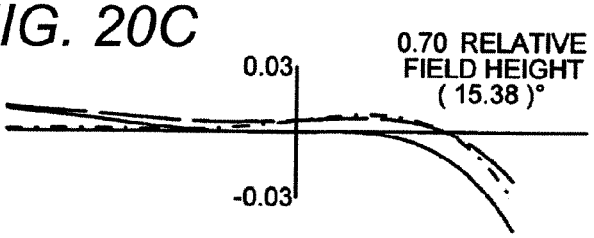
Figure 20H:
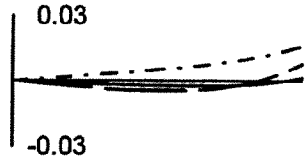
Figure 20D:
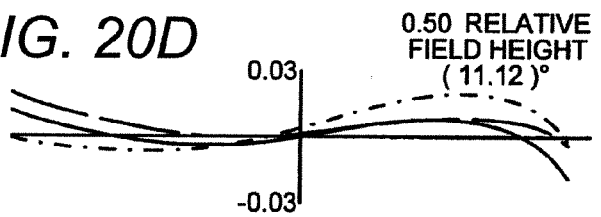
Figure 20I:
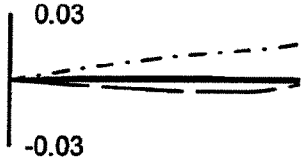
Figure 20E:
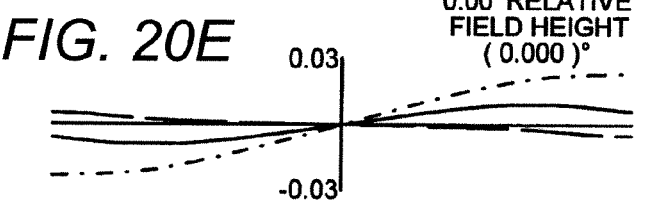
Figure 20J:
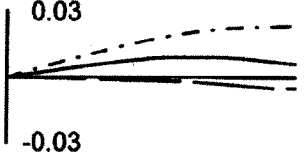
Figure 28A:
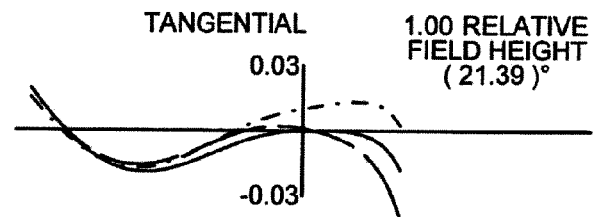
FIGS. 28A to 28J are diagrams of the horizontal astigmatisms at a second focus position in the example 7.
Figure 28B:
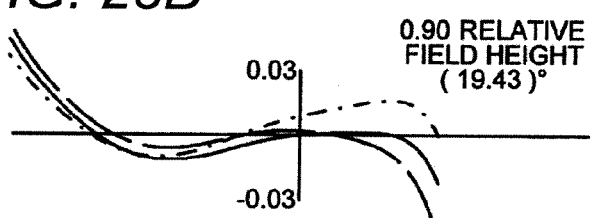
Figure 28C:
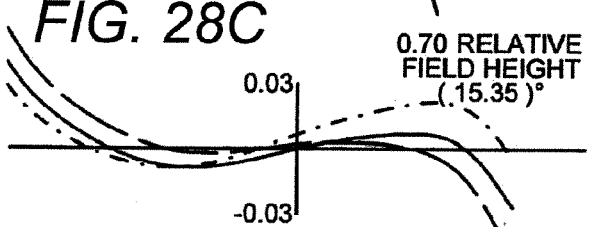
Figure 28D:
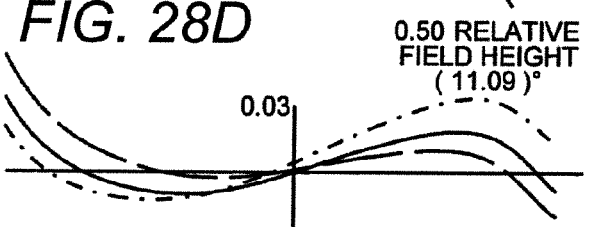
Figure 28E:
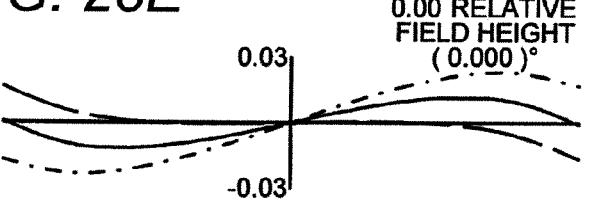
Figure 28F:
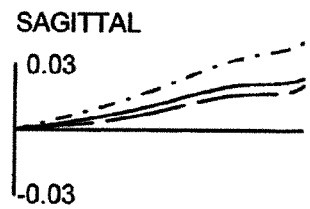
Figure 28G:
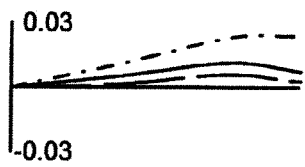
Figure 28H:
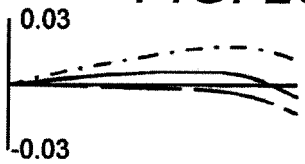
Figure 28I:
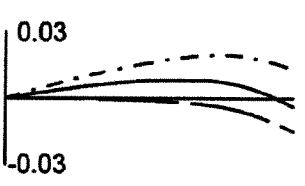
Figure 28J:

Hereinafter, an embodiment of the present invention will be described with reference to the drawings. However, the scope of the invention is not limited to the illustrated examples.

An image-capturing optical system, an image-capturing optical apparatus and a digital device according to the present invention will be described hereinafter. The image-capturing optical system according to the present invention includes a positive first lens group and a positive second lens group that are arranged in order from the object side. The image-capturing optical system focuses on a close object by moving the whole second lens group along the light axis toward the object side. The lens closest to the object side in the second lens group includes a convex surface facing the object side. The lens closest to the image side in the second lens group is a positive meniscus lens including a convex surface facing the image side. The image-capturing optical system satisfies the following condition expressions (1) to (3)

$$2.2<1Gr\_Fl/FL<3.8 \quad (1)$$

$$0.9<2Gr\_Fl/FL<1.5 \quad (2)$$

$$0.45<1Gr\_R\_nop/1Gr\_Thi<0.85 \quad (3)$$

wherein,

FL indicates the focal length of the whole system,

1Gr_Fl indicates the focal length of the first lens group,

2Gr_Fl indicates the focal length of the second lens group,

1Gr_R_nop indicates the distance from the surface closest to the object side in the first lens group to the position of the back principal point, and 1Gr_Thi indicates the whole length of the first lens group.

In comparison with an whole system moving method in which the whole image-capturing optical system is moved for focusing, the total weight of the lens group that moves for focusing may be reduced in an internal focus method in which the second lens group having a positive power (power: the amount defined by the reciprocal of the focal length) is used as the focus group. The lens closest to the object side in the second lens group is formed into a shape having a convex surface facing the object side. The formation can correct coma aberration in the whole focus region. A positive meniscus lens having a convex surface facing the image side is placed closest to the image side in the second lens group. This placement can correct especially coma aberration at the image height with off-axis lights.

The condition expression (1) prescribes the ratio of the focal length of the first lens group to the focal length of the whole system. The ratio higher than the upper limit of the condition expression (1) decreases the power of the first lens group and increases the power of the second lens group. This increases the astigmatism at the image height with off-axis lights. This also increases the weight of the second lens group. The ration lower than the lower limit of the condition expression (1) increases the power of the first lens group and decreases the incident height at which an on-axis light flux enters the second lens group. This makes it difficult to correct spherical aberration or coma aberration.

For example, the value corresponding to the ratio in the condition expression (1) is lower than the lower limit in the lens system described in JP 2013-186458 A1. The difference of power distribution in the first lens group and the second lens group as described in JP 2013-186458 A1 decreases the incident height at which an on-axis light flux enters the second lens group as described above. To correct spherical aberration or coma aberration, the second lens group needs to place a surface with a strong negative power and a surface with a strong positive power therein. Consequently, the placement increases the weight of the second lens group.

The condition expression (2) prescribes the ratio of the focal length of the second lens group to the focal length of the whole system. The ratio higher than the upper limit of the condition expression (2) decreases the power of the second lens group and thus increases the travel distance of the second lens group for focusing. This increases the variations in curvature of field with the variations in incident height with the off-axis light flux between the focus on infinity and the focus on a close distance. The ration lower than the lower limit of the condition expression (2) increases the power of the second lens group and increases the astigmatism at the image height with off-axis lights.

The condition expression (3) prescribes the position of the back principal point of the first lens group. The value of the position higher than the upper limit of the condition expression (3) causes the first lens group to form the image at a position too close to the image-surface side. This decreases the incident height at which an on-axis light flux enters the second lens group. This makes it difficult to correct spherical aberration or coma aberration. The value of the position lower than the lower limit of the condition expression (3) causes the first lens group to form the image at a position too close to the object side. This decreases the power of the second lens group. This disadvantageously makes it difficult to increase the diameter of aperture.

For example, the value corresponding to the value in the condition expression (3) is higher than the upper limit of the condition expression (3) in the lens system described in JP 2013-182024 A1. In other words, the position of the back principal point is set close to the image-surface side in the lens system described in JP 2013-182024 A1. This causes not only a problem on the performance for correcting aberration described above but also the increase in length of the whole system because the increase in interval between the first lens group and the second lens group is required.

According to the characteristic configuration described above, an internal focus image-capturing optical system, which includes a positive first lens group and a positive second lens group that are arranged in order from the object side, and moves the second lens group toward the object side to shift the focus on infinity to the focus on a close distance, has the configuration in which the conditions effective, for example, for the weight reduction of the focus group are appropriately set. This configuration can implement a small and high-performance image-capturing optical system and image-capturing optical apparatus while the system includes a large-aperture lens and a lightweight focus group. For example, the configuration can implement an image-capturing optical system that can use the contrast AF efficiently by reducing the weight of the focus group while the system includes a large-aperture standard lens of which performance variation is limited during focusing.

Using the high-performance and high-functional image-capturing optical system and image-capturing optical apparatus for a digital device such as a digital camera can add a light, compact and high-performance image input function to the digital device. This can contribute, for example, to downsizing the digital device, reducing the production cost of the digital device, and increasing the performance and functionality of the digital device. The image-capturing optical system according to the present invention is suitable for an interchangeable lens for a mirror-less interchangeable lens digital camera. Thus, the image-capturing optical system can implement a light and small interchangeable lens that is useful to carry. The conditions and the like for implementing a higher optical performance, weight reduction, and downsizing of the system with keeping a good balance among the effects described above will be described hereinafter.

The lens closest to the object side in the second lens group preferably has a positive power. Placing a positive lens closest to the object side in the second lens group enables the off-axis light flux to converge. Thus, the placement facilitates the correction of curvature of field. This placement can also prevent the increase in lens diameter in the second lens group. Thus, the placement facilitates also the reduction in weight of the second lens group.

The image-capturing optical system preferably satisfies the following condition expression (4)

$$0.7 < 2Gr\_R\_Fl/2Gr\_Fl < 2.5 \qquad (4)$$

wherein,

2G_R_Fl indicates the focal length of the positive lens placed closest to the image side in the second lens group.

The condition expression (4) prescribes the ratio of the focal length of the whole second lens group and the focal length of the lens placed closest to the image side in the second lens group. The condition expression (4) prescribes a preferable range of the condition for performance for correcting aberration. The ratio higher than the upper limit of the condition expression (4) decreases the power of the positive lens closest to the object side in the second lens group. The decrease increases curvature of field. The ratio lower than the lower limit of the condition expression (4) increases too much the power of the positive lens placed closest to the image side in the second lens group. The increase increases coma aberration on the periphery. On the other hand, the ratio higher than the lower limit of the condition expression (4) can suppress the increase in effective diameter of the lens placed closest to the image side in the second lens group. This facilitates also the implementation of a light focus group. Thus, satisfying the condition expression (4) provides a good optical performance during a period from the focus on infinity to the focus on a close distance while the lenses have a large-aperture ratio and the weight of the focus group is reduced.

The positive lens closest to the image side in the second lens group preferably has an aspheric shape. The positive lens closest to the image side in the second lens group has a large difference between the incident heights of the on-axis light flux and the off-axis light flux. Forming the lens into an aspheric shape can correct curvature of field at each image height efficiently. The aspheric shape on the object side surface of the positive lens is further formed into a shape in which the local curvature changes in a negative direction from the light axis position toward the periphery. The shape further facilitates the correction of curvature of field.

The first lens group preferably includes a diaphragm therein. Placing a diaphragm in the first lens group can suppress the generation of coma aberration in the first lens group. Thus, the placement facilitates the suppression of the variations in aberration during focusing. The first lens group further preferably includes concave surfaces while placing the diaphragm between the concave surfaces. The concave surfaces holding the diaphragm therebetween can further suppress coma aberration.

The convex surface of the lens placed closest to the image side in the first lens group preferably faces the image-surface. The surface of the lens placed closest to the image side in the first lens group is formed into a convex shape facing the image-surface. The formation can provide a convergence action to the light flux entering the first lens group. The formation facilitates the correction of spherical aberration especially.

The image-capturing optical system preferably satisfies the following condition expression (5)

$$W\_2Gr<25 \quad (5)$$

wherein,

W_2Gr indicates the total weight (g) of the lens elements included in the second lens group.

The condition expression (5) prescribes the total weight of the lens elements included in the second lens group. The condition expression (5) prescribes a preferable range of the condition in terms of the balance between the reduction in weight of the focus group and the suppression of the variations in performance during focusing. Satisfying the condition expression (5) reduces the weight of the focus group, and thus can implement a high-speed focusing. Also satisfying the condition expression (2) provides conditions effective for reducing the weight of the focus group. Placing the first lens group having a positive power in front of the second lens group that is the focus group enables the converging light to enter the focus group. This can reduce the weight of focusing group by preventing the increase in effective diameter in the focus group. The value lower than the lower limit of the condition expression (2) increases the power of the second lens group. This requires the second lens group to include a lens made of a high refractive material. This requirement increases the weight of the focus group. The value higher than the upper limit of the second lens group decreases the power of the second lens group. The value increases especially the effective diameter of the lens placed closest to the image side in the second lens group. This increases the weight of the focus group. Both of the condition expression (2) and the condition expression (5) are preferably satisfied in order to reduce the weight of the focus group and improve the focus performance.

The image-capturing optical system is configured to form an optical image of a subject on the image-capturing surface of the image-capturing element. The image-capturing surface preferably has a screen size of which diagonal length is 2y_max. The image-capturing optical system preferably satisfies the following condition expression (6)

$$20<\arctan(y\_max/FL)<25 \quad (6)$$

wherein, y_max indicates a maximum image height, and

FL indicates the focal length of the whole system.

The condition expression (6) defines the angle of view of the image-capturing optical system according to the present invention and prescribes a preferable range of the condition in terms of the balance between the reduction in weight of the focus group and the suppression of the variations in performance during focusing. Satisfying the condition expression (6) can achieve the angle of view of a standard lens. When the image-capturing optical system has an angle of view in the range of the condition expression (6) satisfies the condition expressions (1) and (2), the image-capturing optical system can reduce the weight of the focus group and improve the focus performance most efficiently.

The image-capturing optical system according to the present invention is suitable to use as an image-capturing lens of a digital device with an image input function (for example, a digital camera). Combining the image-capturing optical system, for example, with an image-capturing element can implement an image-capturing optical apparatus that captures an image of a subject optically and outputs the image as an electric signal. The image-capturing optical apparatus is an optical apparatus to be a main component of a camera used to shoot a still image or a movie. The image-capturing optical apparatus includes, for example, an image-capturing optical system configured to form an optical image of an object (namely, a subject), and an image-capturing element configured to convert the optical image formed with the image-capturing optical system into an electric signal that are arranged in order from the object side. Furthermore, an image-capturing optical system including the characteristic configuration described above is placed in an image-capturing optical apparatus so as to form the optical image of the subject on a light-receiving surface (namely, the image-capturing surface) of the image-capturing element. The placement can implement a small and high-performance image-capturing optical apparatus that can be produced at a low cost, and a digital device including the image-capturing optical apparatus.

A digital camera, a video camera, a monitoring camera, a security camera, a vehicle-mounted camera, and a camera for a videophone are cited as examples of the a digital device with an image input function. Furthermore, a personal computer, a mobile digital device (for example, a mobile phone, a smartphone (high functional mobile phone), a tablet terminal, or a mobile computer), a peripheral device of them (for example, a scanner, a printer, or a mouse), and another digital device (for example, an event data recorder, or a defensive device) on which the camera function is installed internally or externally are cited as the examples. As described with the example, the image-capturing optical apparatus can be used not only as a component of a camera but also to add a camera function to each of the devices by installing the image-capturing optical apparatus on each of the devices. For example, a digital device with an image input function, such as a mobile phone with a camera, can be implemented with the image-capturing optical apparatus.

Figure 29:
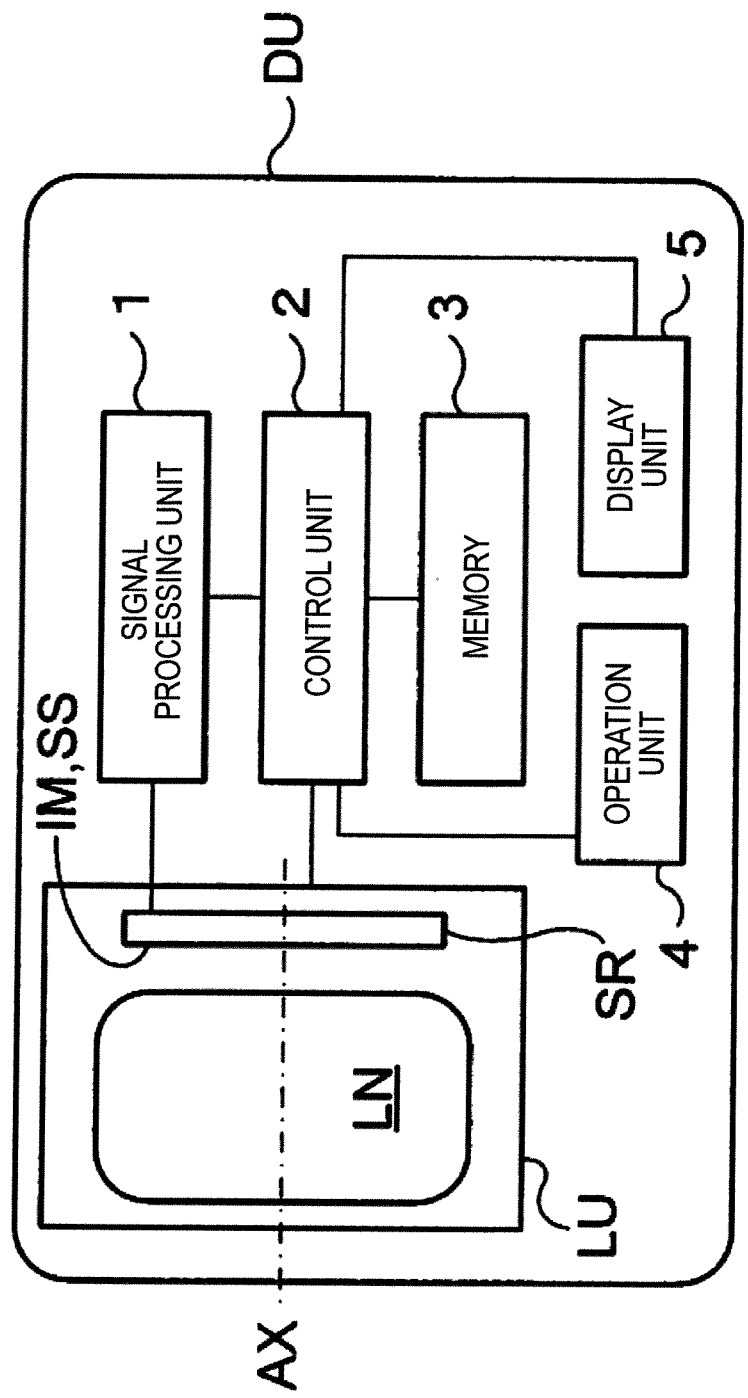
FIG. 29 is a schematic diagram of an exemplary configuration of a digital device on which an image-capturing optical apparatus is installed.

FIG. 29 is a cross-sectional pattern diagram of a schematic configuration of a digital device DU that is an example of a digital device with an image input function. An image-capturing optical apparatus LU installed on the digital device DU illustrated in FIG. 29 includes an image-capturing optical system LN configured to form an optical image (image-surface) IM of an object (namely, a subject) (AX: light axis), and an image-capturing element SR configured to convert the optical image IM formed on a light-receiving surface (image-capturing surface) SS with the image-capturing optical system LN into an electric signal. The image-capturing optical system LN and the image-capturing element SR are arranged in order from the object in the image-capturing optical apparatus LU. A plane parallel plate (for example, a cover glass of the image-capturing element SR, and the cover glass corresponds to an optical filter, such as an optical low-pass filter or an infrared cut filter, that is placed as necessary) is also placed in the image-capturing optical apparatus LU as necessary. When being used as a component of a digital device with an image input function DU, the image-capturing optical apparatus LU needs to be placed inside the body of the digital device. On the other hand, when being used as a camera function, the image-capturing optical apparatus LU can have any configuration as needed. For example, an image-capturing optical apparatus LU formed into a unit shape can be detachably or rotatably attached to the body of a digital device DU.

The image-capturing optical system LN is a standard lens system including two or more groups including two positive groups on the object side. The image-capturing optical system LN is configured to focus on a close distance object by moving the whole second lens group along the light axis AX toward the object side and form an optical image IM on the light-receiving surface SS of the image-capturing element SR. A solid image-capturing element, such as a CCD image sensor or CMOS image sensor with a plurality of pixels, is used for the image-capturing element SR. The image-capturing optical system LN is provided so as to form an optical image IM of the subject on the light-receiving surface SS that is a photoelectric converting unit of the image-capturing element SR. Thus, the optical image IM formed with the image-capturing optical system LN is converted into an electric signal with the image-capturing element SR.

The digital device DU includes, for example, a signal processing unit 1, a control unit 2, a memory 3, an operation unit 4, and a display unit 5 in addition to the image-capturing optical apparatus LU. The signal generated in the image-capturing element SR is processed as necessary in a predetermined digital image process or image compression process in the signal processing unit 1, and then is recorded as a digital image signal in the memory 3 (for example, a semiconductor memory, or an optical disk). Alternatively, the signal is converted, for example, into an infrared signal and transferred, for example, through a cable to another device (for example, a communication function in a mobile phone) in some cases. The control unit 2 includes a microcomputer so as to collectively control the function such as an image-shooting function (for example, a still image shooting function, or a movie shooting function), a function such as an image reproducing function, and a lens moving mechanism for focusing or camera shake correction. For example, the control unit 2 controls the image-capturing optical apparatus LU to shoot at least one of a still image and a movie of the subject. The display unit 5 includes a display such as a liquid crystal monitor so as to display an image in accordance with the image signal converted with the image-capturing element SR, or the image information recorded in the memory 3. The operation unit 4 includes, for example, an operation unit such as an operation button (for example, a release button), an operation dial (for example, a shooting mode dial) so as to transmit the information input by the operator's operation to the control unit 2.

The specific optical configuration of the image-capturing optical system LN will be described further in detail in the first to seventh embodiments. Each of FIGS. 1 to 7 is a diagram of the configuration of lenses of the image-capturing optical system LN in each of the first to seventh embodiments, and illustrates an optical cross-sectional view of the lens arrangement at a first focus position POS1 (a state on infinity from the subject). The second lens group Gr2 moves along the light axis AX for focusing. In other words, the second lens group Gr2, which is a focus group, moves toward the object side as indicated with an arrow mF when the image-capturing optical system LN focuses on a close distance object.

An image-capturing optical system LN in the first embodiment (FIG. 1) includes two positive groups. Each of the groups has a configuration to be described below. The first lens group Gr1 includes, in order from the object side, a positive meniscus lens L11 having a convexity on the object-plane side, a negative meniscus lens L12 having a convexity on the object-plane side, a cemented lens including a biconvex positive lens L13 and a biconcave negative lens L14, a diaphragm ST, and a cemented lens including a biconcave negative lens L15 and a biconvex positive lens L16. The second lens group Gr2 includes a positive meniscus lens L21 having a convexity on the object-plane side, a biconcave lens L22, and a positive meniscus lens L23 having a convexity on the image-surface side.

An image-capturing optical system LN in the second embodiment (FIG. 2) includes two positive groups. Each of the groups has a configuration to be described below. The first lens group Gr1 includes, in order from the object side, a cemented lens including a positive meniscus lens L11 having a convexity on the object-plane side and a negative meniscus lens L12 having a convexity on the object-plane side, a cemented lens including a biconvex positive lens L13 and a biconcave negative lens L14, a diaphragm ST, and a cemented lens including a biconcave negative lens L15 and a biconvex positive lens L16. The second lens group Gr2 includes a positive meniscus lens L21 having a convexity on the object-plane side, a negative meniscus lens L22 having a concavity on the image-surface side, and a positive meniscus lens L23 having a convexity on the image-surface side.

An image-capturing optical system LN in the third embodiment (FIG. 3) includes two positive groups. Each of the groups has a configuration to be described below. The first lens group Gr1 includes, in order from the object side, a cemented lens including a positive meniscus lens L11 having a convexity on the object-plane side and a negative meniscus lens L12 having a convexity on the object-plane side, a cemented lens including a biconvex positive lens L13 and a biconcave negative lens L14, a diaphragm ST, and a cemented lens including a biconcave negative lens L15 and a biconvex positive lens L16. The second lens group Gr2 includes a positive meniscus lens L21 having a convexity on the object-plane side, a negative meniscus lens L22 having a concavity on the image-surface side, and a positive meniscus lens L23 having a convexity on the image-surface side.

An image-capturing optical system LN in the fourth embodiment (FIG. 4) includes two positive groups. Each of the groups has a configuration to be described below. The first lens group Gr1, in order from the object side, includes a cemented lens including a positive meniscus lens L11 having a convexity on the object-plane side and a negative meniscus lens L12 having a convexity on the object-plane side, a cemented lens including a biconvex positive lens L13 and a biconcave negative lens L14, a diaphragm ST, and a cemented lens including a biconcave negative lens L15 and a biconvex positive lens L16. The second lens group Gr2 includes a positive meniscus lens L21 having a convexity on the object-plane side, a negative meniscus lens L22 having a concavity on the image-surface side, and a positive meniscus lens L23 having a convexity on the image-surface side.

An image-capturing optical system LN in the fifth embodiment (FIG. 5) includes two positive groups. Each of the groups has a configuration to be described below. The first lens group Gr1 includes, in order from the object side, a cemented lens including a positive meniscus lens L11 having a convexity on the object-plane side and a negative meniscus lens L12 having a convexity on the object-plane side, a cemented lens including a biconvex positive lens L13 and a biconcave negative lens L14, a diaphragm ST, and a cemented lens including a biconcave negative lens L15 and a biconvex positive lens L16. The second lens group Gr2 includes a cemented lens including a biconvex positive lens L21 and a biconcave negative lens L22, and a positive meniscus lens L23 having a convexity on the image-surface side.

An image-capturing optical system LN in the sixth embodiment (FIG. 6) includes two positive groups. Each of the groups has a configuration to be described below. The first lens group Gr1 includes, in order from the object side, a cemented lens including a positive meniscus lens L11 having a convexity on the object-plane side and a negative meniscus lens L12 having a convexity on the object-plane side, a cemented lens including a biconvex positive lens L13 and a biconcave negative lens L14, a diaphragm ST, and a cemented lens including a biconcave negative lens L15 and a biconvex positive lens L16. The second lens group Gr2 includes a cemented lens including a positive meniscus lens L21 having a convexity on the object-plane side and a negative meniscus lens L22 having a concavity on the image-surface side, and a positive meniscus lens L23 having a convexity on the image-surface side.

An image-capturing optical system LN in the seventh embodiment (FIG. 7) includes three, namely two positive and one negative, groups. Each of the groups has a configuration to be described below. The first lens group Gr1 includes, in order from the object side, a cemented lens including a positive meniscus lens L11 having a convexity on the object-plane side and a negative meniscus lens L12 having a convexity on the object-plane side, a cemented lens including a biconvex positive lens L13 and a biconcave negative lens L14, a diaphragm ST, and a cemented lens including a biconcave negative lens L15 and a biconvex positive lens L16. The second lens group Gr2 includes a positive meniscus lens L21 having a convexity on the object-plane side, and a positive meniscus lens L22 having a convexity on the image-surface side. The third lens group Gr3 includes a negative meniscus lens L31 having a concavity on the image-surface side.

The image-capturing optical system LN in each of the embodiments includes the lens L21 closest to the object side and having a convex surface facing the object side in the second lens group Gr2, and includes the lens L23 (in FIG. 1 to 6) or L22 (in FIG. 7) that is a positive meniscus lens closest to the image side and having a convex surface facing the image side in the second lens group Gr2. The lens L21 closest to the object side in the second lens group Gr2 has a positive power while the positive lens L23 (in FIG. 1 to 6) or L22 (in FIG. 7) closest to the image side in the second lens group Gr2 has an aspheric shape. The diaphragm ST is placed in the first lens group Gr1. The lens L16 placed closest to the image side in the first lens group Gr1 has a convex surface facing the image-surface IM. Note that a plane parallel plate PT is placed between the image-capturing optical system LN and the image-surface IM. The plane parallel plate PT is a glass plane plate having an optical thickness equivalent to the total optical thickness of the cover glass and moire-preventing low-pass filter in the image-capturing element SR.

Symmetrically placing the cemented lens that have a concavity facing the diaphragm ST and that hold the diaphragm ST therebetween can correct coma aberration successfully. For example, in each of the first to third embodiments, both of the two positive lenses in the second lens group Gr2 are aspheric lenses. Using such aspheric lenses in the second lens group Gr2 can suppress the variations in aberration during focusing. Furthermore, including a negative lens in the second lens group Gr2 that is the focus group can reduce the generation of coma aberration in the focus group, and thus can provide a good focus performance from on infinity to on a close distance. The negative lens has a concave surface facing the image-surface IM in the second lens group Gr2. The configuration can further increase the effect of reducing coma aberration.

EXAMPLES

The configuration of the image-capturing optical system that is each of the embodiments of the present invention will be mainly described further in detail hereinafter with reference to the data about the configuration of each embodiment. The examples 1 to 7 (EX1 to EX7) cited herein are numeric examples corresponding to the first to seventh embodiments. The diagrams of the configurations of lenses in the first to seventh embodiments (FIGS. 1 to 7) illustrate the optical configurations corresponding to the examples 1 to 7, respectively.

In the data about the configuration of each embodiment, the data about the surfaces indicates, in order from the left side column, the surface number i (OB: the object-plane, ST: the aperture surface, IM: the image-surface), the radius of curvature r (mm), the interval d between the surfaces on the axis (mm), the refractive index nd at the d line (the wavelength 587.56 nm), the Abbe number vd in relation to the d line, and the effective radius R (mm). The surface having a surface number i with "*" is an aspheric surface. The shape of the surface is defined by the following expression (AS) using a local rectangular coordinate system (x, y, and z) of which origin is the turning point of the surface. The expression (AS) indicates, for example, an aspheric coefficient as the data about the aspheric surface. Note that, in the data about the aspheric surfaces of each embodiment, the items that are not indicted in the data have a coefficient of zero. The expression $E-n=\times 10^{-n}$ holds in the data of every embodiment.

$$z=(C\cdot h^2)/[1+\sqrt{\{1-(1+K)\cdot c^2\cdot h^2\}}]+\Sigma(Aj\cdot h^j) \quad (AS)$$

wherein, h indicates the height in the direction perpendicular to a z axis (the light axis AX) ($h^2=x^2+y^2$), z indicates the amount of sag in the direction of the light axis AX at the height h (based on the turning point of the surface), c indicates the curvature at the turning point of the surface (the reciprocal of the radius of curvature r), K indicates the conic constant, and Aj indicates the j-dimensional aspheric coefficient.

The various types of data indicate the focal length FL of the whole system (mm), the F number (FNO), the maximum angle of view 2ω (°), and the whole length TL of lenses (the distance from the foremost surface of the lenses to the image-surface IM (mm)). Furthermore, the aperture radius (effective radius R) and the variable interval di between the surfaces on the axis (i: surface number) at each of the first focus position POS1 (the distance to the object: infinity) and the second focus position POS2 (the distance to the object: 320 mm) are indicated as variable parameters that vary depending on the focusing. A table 1 indicates the values corresponding to the condition expressions in each embodiment and the data related to the values.

FIGS. 8A to 14F are diagrams of the vertical astigmatisms corresponding to the examples 1 to 7 (EX1 to EX7), respectively. FIGS. 8A to 8C, 9A to 9C, 10A to 10C, 11A to 11C, 12A to 12C, 13A to 13C, and 14A to 14C illustrate various aberrations at the first focus position POS1. FIGS. 8D to 8F, 9D to 9F, 10D to 10F, 11D to 11F, 12D to 12F, 13D to 13F, and 14D to 14F illustrate various aberrations at the second focus position POS2. Each of FIGS. 8A and 8D, 9A and 9D, 10A and 10D, 11A and 11D, 12A and 12D, 13A and 13D, and 14A and 14D illustrates the spherical aberration. Each of FIGS. 8B and 8E, 9B and 9E, 10B and 10E, 11B and 11E, 12B and 12E, 13B and 13E, and 14B and 14E illustrates the astigmatism. Each of FIGS. 8C and 8F, 9C and 9F, 10C and 10F, 11C and 11F, 12C and 12F, 13C and 13F, and 14C and 14F illustrates the distortion aberration. Each of the drawings of the spherical aberration illustrates the amount of spherical aberration at the d line denoted with a solid line (the wavelength is 587.56 nm), the amount of spherical aberration at the c line denoted with an alternate long and short dashed line (the wavelength is 656.28 nm), the amount of spherical aberration at the g line denoted with a dashed line (the wavelength is 435.84 nm). Each of the amounts of spherical aberration is indicated as the amount of deviation in the direction of the light axis AX from the paraxial image-surface (the unit is mm). The value obtained by standardizing the incident height at which the light enters the pupil with the maximum height (namely, the relative pupil height) is shown on the vertical axis. In each of the drawings of the astigmatism, a dashed line T denotes the tangential image-surface at the d line, and a solid line S denotes the sagittal image-surface at the d line. The tangential image-surface and sagittal image-surface are indicated as the amount of deviation in the direction of the light axis AX from the paraxial image-surface (the unit is mm). The image height (IMG HT (the unit is mm)) is shown on the vertical axis. In each of the drawings of the distortion aberration, the distortion at the d line is shown on the horizontal axis (the unit is %), and the image height (IMG HT (the unit is mm)) is shown on the vertical axis. Note that the maximum value of the image height IMG HT corresponds to a maximum image height Y' on the image-surface IM (the half of the diagonal length of the light-receiving surface SS in the image-capturing element SR).

FIGS. 15A to 28J are diagrams of the horizontal astigmatisms corresponding to the examples 1 to example 7 (EX1 to EX7), and each illustrate the horizontal astigmatism (mm) at the first focus position POS1 or second focus position POS2. Each of FIGS. 15A to 15E, 16A to 16E, 17A to 17E, 18A to 18E, 19A to 19E, 20A to 20E, 21A to 21E, 22A to 22E, 23A to 23E, 24A to 24E, 25A to 25E, 26A to 26E, 27A to 27E, and 28A to 28E illustrates the horizontal astigmatism by a tangential light flux. Each of FIGS. 15F to 15J, 16F to 16J, 17F to 17J, 18F to 18J, 19F to 19J, 20F to 20J, 21F to 21J, 22F to 22J, 23F to 23J, 24F to 24J, 25F to 25J, 26F to 26J, 27F to 27J, and 28F to 28J illustrates the horizontal astigmatism by a sagittal light flux. The RELATIVE FIELD HEIGHT indicates the image height rate (half angle of view ω°). The horizontal astigmatism at the image height rate is indicated each at the d line denoted with a solid line (the wavelength is 587.56 nm), at the c line denoted with an alternate long and short dashed line (the wavelength is 656.28 nm), at the g line denoted with a dashed line (the wavelength is 435.84 nm). Note that the image height rate is a relative image height obtained by standardizing the image height with the maximum image height Y'.

Example 1

Unit: mm

Data about Surface

| i | r | d | nd | vd | R |
|---|---|---|---|---|---|
| OB | ∞ | Variable | | | |
| 1 | 26.023 | 3.10 | 1.92286 | 20.88 | 13.800 |
| 2 | 36.965 | 0.10 | | | 13.254 |
| 3 | 25.381 | 0.80 | 1.58144 | 40.89 | 12.899 |
| 4 | 15.107 | 2.76 | | | 11.737 |
| 5 | 20.875 | 6.21 | 1.88100 | 40.14 | 11.725 |
| 6 | −61.734 | 0.80 | 1.74077 | 27.76 | 11.237 |
| 7 | 16.304 | 3.87 | | | 9.516 |
| 8(ST) | ∞ | 4.60 | | | Variable |
| 9 | −18.904 | 0.80 | 1.71736 | 29.50 | 9.560 |
| 10 | 22.994 | 7.41 | 1.88100 | 40.14 | 11.307 |
| 11 | −24.058 | Variable | | | 11.592 |
| *12 | 20.818 | 4.23 | 1.80860 | 40.42 | 10.200 |
| *13 | 36.325 | 4.13 | | | 9.557 |
| 14 | −326.087 | 0.90 | 1.71736 | 29.50 | 9.670 |
| 15 | 39.492 | 3.71 | | | 9.800 |
| *16 | −1898.200 | 4.48 | 1.74320 | 49.30 | 10.712 |
| *17 | −26.391 | Variable | | | 11.454 |
| 18 | ∞ | 1.50 | 1.51680 | 64.20 | 15.000 |
| 19 | ∞ | 0.85 | | | 15.000 |
| IM | ∞ | | | | |

Data about Aspheric Surface

| i | 12 | 13 | 16 | 17 |
|---|---|---|---|---|
| K | 0 | 0 | 0 | 0 |
| A4 | 2.451E−05 | 5.117E−05 | −1.142E−05 | 4.650E−07 |
| A6 | −1.274E−08 | −4.816E−08 | −2.720E−07 | −2.263E−07 |
| A8 | 8.825E−10 | 1.826E−09 | 1.129E−09 | 9.904E−10 |
| A10 | 0.000E+00 | 0.000E+00 | −6.579E−12 | −5.779E−12 |
| A12 | 0.000E+00 | 0.000E+00 | 0.000E+00 | 0.000E+00 |

Various Types of Data

| | |
|---|---|
| FL | 36.0 |
| FNO | 1.44 |
| 2ω | 43.1 |
| TL | 72.0 |

Variable Parameters

| Distance to Object | Aperture Radius | d11 | d17 |
|---|---|---|---|
| ∞ (POS1) | 9.451 | 6.56 | 15.25 |
| 320 mm (POS2) | 6.917 | 1.00 | 20.81 |

Example 2

Unit: mm

Data about Surface

| i | r | d | nd | vd | R |
|---|---|---|---|---|---|
| OB | ∞ | Variable | | | |
| 1 | 25.000 | 3.20 | 1.92286 | 20.88 | 13.800 |
| 2 | 35.652 | 0.80 | 1.54072 | 47.20 | 13.155 |
| 3 | 15.628 | 2.82 | | | 11.684 |
| 4 | 22.565 | 5.88 | 1.88100 | 40.14 | 11.599 |
| 5 | −52.994 | 0.80 | 1.74077 | 27.76 | 11.111 |
| 6 | 20.116 | 3.29 | | | 9.558 |
| 7(ST) | ∞ | 4.56 | | | Variable |
| 8 | −19.414 | 0.80 | 1.72825 | 28.32 | 9.579 |
| 9 | 25.366 | 7.00 | 1.88100 | 40.14 | 10.949 |
| 10 | −24.590 | Variable | | | 11.263 |
| *11 | 19.873 | 4.43 | 1.80860 | 40.42 | 10.400 |
| *12 | 169.014 | 0.20 | | | 10.031 |
| 13 | 86.985 | 0.90 | 1.67270 | 32.17 | 9.977 |
| 14 | 18.590 | 8.94 | | | 9.500 |
| *15 | −56.772 | 3.77 | 1.74320 | 49.30 | 10.904 |
| *16 | −24.091 | Variable | | | 11.700 |
| 17 | ∞ | 1.50 | 1.51680 | 64.20 | 14.002 |
| 18 | ∞ | 0.85 | | | 14.129 |
| IM | ∞ | | | | |

Data about Aspheric Surface

| i | 11 | 12 | 15 | 16 |
|---|---|---|---|---|
| K | 0 | 0 | 0 | 0 |
| A4 | 2.143E−06 | 2.156E−05 | −2.017E−05 | −4.560E−06 |
| A6 | 1.112E−08 | −2.258E−08 | −7.711E−08 | −6.286E−08 |
| A8 | 0.000E+00 | 0.000E+00 | −1.253E−09 | −7.531E−10 |
| A10 | 0.000E+00 | 0.000E+00 | 0.000E+00 | 0.000E+00 |
| A12 | 0.000E+00 | 0.000E+00 | 0.000E+00 | 0.000E+00 |

Various Types of Data

| | |
|---|---|
| FL | 34.4 |
| FNO | 1.44 |
| 2ω | 44.7 |
| TL | 70.0 |

Variable Parameters

| Distance to Object | Aperture Radius | d10 | d16 |
|---|---|---|---|
| ∞ (POS1) | 9.565 | 5.99 | 14.30 |
| 320 mm (POS2) | 6.949 | 1.00 | 19.29 |

Example 3

Unit: mm

Data about Surface

| i | r | d | nd | vd | R |
|---|---|---|---|---|---|
| OB | ∞ | Variable | | | |
| 1 | 25.374 | 3.24 | 1.92286 | 20.88 | 13.800 |
| 2 | 37.384 | 0.80 | 1.54072 | 47.20 | 13.171 |
| 3 | 15.667 | 2.85 | | | 11.683 |
| 4 | 22.941 | 6.11 | 1.88300 | 40.81 | 11.605 |
| 5 | −44.448 | 0.80 | 1.75520 | 27.53 | 11.113 |
| 6 | 20.326 | 3.38 | | | 9.821 |
| 7(ST) | ∞ | 4.73 | | | Variable |
| 8 | −19.277 | 0.80 | 1.71736 | 29.50 | 9.886 |
| 9 | 26.038 | 7.14 | 1.88300 | 40.81 | 11.454 |
| 10 | −24.705 | Variable | | | 11.726 |
| *11 | 22.002 | 3.69 | 1.80860 | 40.42 | 10.400 |
| *12 | 81.929 | 2.19 | | | 10.066 |
| 13 | 115.042 | 0.90 | 1.68893 | 31.16 | 9.749 |
| 14 | 23.390 | 7.52 | | | 9.500 |
| *15 | −201.941 | 3.92 | 1.74320 | 49.30 | 11.036 |
| *16 | −30.031 | Variable | | | 11.738 |
| 17 | ∞ | 1.50 | 1.51680 | 64.20 | 15.000 |
| 18 | ∞ | 0.86 | | | 15.000 |
| IM | ∞ | | | | |

Data about Aspheric Surface

| i | 11 | 12 | 15 | 16 |
|---|---|---|---|---|
| K | 0 | 0 | 0 | 0 |
| A4 | 6.747E−06 | 2.047E−05 | −1.828E−05 | −6.233E−06 |
| A6 | 9.750E−09 | −1.855E−08 | −8.421E−08 | −6.805E−08 |
| A8 | 0.000E+00 | 0.000E+00 | −9.906E−10 | −6.513E−10 |
| A10 | 0.000E+00 | 0.000E+00 | 0.000E+00 | 0.000E+00 |
| A12 | 0.000E+00 | 0.000E+00 | 0.000E+00 | 0.000E+00 |

Various Types of Data

| | |
|---|---|
| FL | 35.5 |
| FNO | 1.44 |
| 2ω | 43.6 |
| TL | 72.0 |

Variable Parameters

| Distance to Object | Aperture Radius | d10 | d16 |
|---|---|---|---|
| ∞ (POS1) | 9.840 | 6.35 | 15.25 |
| 320 mm (POS2) | 7.163 | 1.00 | 20.60 |

Example 4

Unit: mm

Data about Surface

| i | r | d | nd | vd | R |
|---|---|---|---|---|---|
| OB | ∞ | Variable | | | |
| 1 | 25.630 | 3.77 | 1.92286 | 20.88 | 13.800 |
| 2 | 48.443 | 0.80 | 1.54072 | 47.20 | 13.171 |
| 3 | 14.743 | 3.57 | | | 11.316 |
| 4 | 24.377 | 6.72 | 1.88100 | 40.14 | 11.203 |
| 5 | −26.936 | 0.80 | 1.78472 | 25.72 | 10.677 |
| 6 | 20.991 | 3.09 | | | 9.389 |
| 7(ST) | ∞ | 4.72 | | | Variable |
| 8 | −18.097 | 0.80 | 1.68893 | 31.16 | 9.544 |
| 9 | 23.482 | 7.48 | 1.83481 | 42.72 | 11.306 |
| 10 | −23.619 | Variable | | | 11.607 |
| 11 | 20.976 | 3.28 | 1.72916 | 54.67 | 10.400 |
| 12 | 39.868 | 1.85 | | | 10.114 |
| 13 | 14.109 | 0.90 | 1.49700 | 81.61 | 9.803 |
| 14 | 13.068 | 8.61 | | | 9.500 |
| *15 | −1389.170 | 2.22 | 1.74320 | 49.30 | 10.347 |
| *16 | −57.162 | Variable | | | 10.760 |
| 17 | ∞ | 1.50 | 1.51680 | 64.20 | 15.000 |
| 18 | ∞ | 0.84 | | | 15.000 |
| IM | ∞ | | | | |

Data about Aspheric Surface

| i | 15 | 16 |
|---|---|---|
| K | 0 | 0 |
| A4 | −5.591E−05 | −3.077E−05 |
| A6 | −1.794E−07 | −1.754E−07 |
| A8 | −1.983E−09 | −9.301E−10 |
| A10 | 1.888E−11 | 1.261E−11 |
| A12 | 0.000E+00 | 0.000E+00 |

Example 5 (continued)

Unit: mm

Various Types of Data

| | |
|---|---|
| FL | 34.4 |
| FNO | 1.44 |
| 2ω | 44.9 |
| TL | 72.0 |

Variable Parameters

| Distance to Object | Aperture Radius | d10 | d16 |
|---|---|---|---|
| ∞ (POS1) | 9.437 | 5.83 | 15.25 |
| 320 mm (POS2) | 6.899 | 1.00 | 20.08 |

Example 5

Unit: mm

Data about Surface

| i | r | d | nd | vd | R |
|---|---|---|---|---|---|
| OB | ∞ | Variable | | | |
| 1 | 25.000 | 3.42 | 1.92286 | 20.88 | 13.800 |
| 2 | 38.852 | 0.80 | 1.54072 | 47.20 | 13.157 |
| 3 | 14.821 | 3.23 | | | 11.476 |
| 4 | 23.135 | 6.09 | 1.88100 | 40.14 | 11.407 |
| 5 | −41.117 | 0.80 | 1.75520 | 27.53 | 10.924 |
| 6 | 20.433 | 3.22 | | | 9.597 |
| 7(ST) | ∞ | 4.57 | | | Variable |
| 8 | −19.457 | 0.80 | 1.72825 | 28.32 | 9.745 |
| 9 | 24.147 | 7.32 | 1.88100 | 40.14 | 11.415 |
| 10 | −23.734 | Variable | | | 11.676 |
| 11 | 19.159 | 6.46 | 1.72916 | 54.67 | 10.400 |
| 12 | −97.807 | 1.00 | 1.74320 | 49.30 | 9.982 |
| *13 | 21.886 | 6.81 | | | 9.500 |
| *14 | −54.685 | 3.84 | 1.74320 | 49.30 | 10.158 |
| *15 | −23.410 | Variable | | | 11.222 |
| 16 | ∞ | 1.50 | 1.51680 | 64.20 | 15.000 |
| 17 | ∞ | 0.86 | | | 15.000 |
| IM | ∞ | | | | |

Data about Aspheric Surface

| i | 13 | 14 | 15 |
|---|---|---|---|
| K | 0 | 0 | 0 |
| A4 | 1.815E−05 | −4.464E−05 | −2.129E−05 |
| A6 | −1.089E−08 | −6.933E−07 | −4.329E−07 |
| A8 | 0.000E+00 | 4.553E−09 | 2.071E−09 |
| A10 | 0.000E+00 | −4.799E−11 | −1.828E−11 |
| A12 | 0.000E+00 | 0.000E+00 | 0.000E+00 |

Various types of data

| | |
|---|---|
| FL | 34.4 |
| FNO | 1.44 |
| 2ω | 44.9 |
| TL | 72.0 |

Variable Parameters

| Distance to Object | Aperture Radius | d10 | d15 |
|---|---|---|---|
| ∞ (POS1) | 9.641 | 6.08 | 15.25 |
| 320 mm (POS2) | 7.006 | 1.00 | 20.33 |

Example 6

Unit: mm

Data about Surface

| i | r | d | nd | vd | R |
|---|---|---|---|---|---|
| OB | ∞ | Variable | | | |
| 1 | 29.514 | 4.05 | 1.92286 | 20.88 | 13.800 |
| 2 | 90.716 | 0.80 | 1.54072 | 47.20 | 13.155 |
| 3 | 15.067 | 2.82 | | | 10.982 |
| 4 | 22.457 | 6.30 | 1.88100 | 40.14 | 10.800 |
| 5 | −29.085 | 0.80 | 1.78472 | 25.72 | 10.395 |
| 6 | 20.699 | 3.10 | | | 9.387 |
| 7(ST) | ∞ | 4.47 | | | Variable |
| 8 | −19.656 | 0.80 | 1.72825 | 28.32 | 9.470 |
| 9 | 21.234 | 7.22 | 1.88100 | 40.14 | 10.986 |
| 10 | −26.614 | Variable | | | 11.254 |
| 11 | 23.808 | 4.09 | 1.88100 | 40.14 | 10.400 |
| 12 | 132.604 | 1.00 | 1.64769 | 33.84 | 9.980 |
| 13 | 26.086 | 9.92 | | | 9.500 |
| *14 | −204.920 | 3.29 | 1.80860 | 40.42 | 10.916 |
| *15 | −36.502 | Variable | | | 11.814 |
| 16 | ∞ | 1.50 | 1.51680 | 64.20 | 15.000 |
| 17 | ∞ | 0.84 | | | 15.000 |
| IM | ∞ | | | | |

Data about Aspheric Surface

| i | 14 | 15 |
|---|---|---|
| K | 0 | 0 |
| A4 | −6.743E−05 | −4.356E−05 |
| A6 | −4.001E−07 | −3.231E−07 |
| A8 | 2.600E−10 | 5.196E−10 |
| A10 | −1.365E−11 | −6.835E−12 |
| A12 | 0.000E+00 | 0.000E+00 |

Various Types of Data

| | |
|---|---|
| FL | 34.4 |
| FNO | 1.44 |
| 2ω | 44.9 |
| TL | 72.0 |

Variable Parameters

| Distance to Object | Aperture Radius | d10 | d15 |
|---|---|---|---|
| ∞ (POS1) | 9.411 | 5.78 | 15.25 |
| 320 mm (POS2) | 6.868 | 1.00 | 20.03 |

Example 7

Unit: mm

Data about Surface

| i | r | d | nd | vd | R |
|---|---|---|---|---|---|
| OB | ∞ | Variable | | | |
| 1 | 25.000 | 3.90 | 1.92286 | 20.88 | 13.500 |
| 2 | 52.552 | 0.80 | 1.58144 | 40.89 | 12.885 |
| 3 | 14.862 | 3.08 | | | 11.084 |
| 4 | 23.099 | 6.33 | 1.88100 | 40.14 | 11.032 |
| 5 | −35.353 | 0.80 | 1.80518 | 25.46 | 10.714 |
| 6 | 20.520 | 3.77 | | | 9.761 |
| 7(ST) | ∞ | 4.77 | | | Variable |
| 8 | −19.571 | 0.80 | 1.72825 | 28.32 | 10.025 |
| 9 | 24.189 | 7.94 | 1.88100 | 40.14 | 11.960 |
| 10 | −23.952 | Variable | | | 12.247 |
| *11 | 19.226 | 3.57 | 1.80860 | 40.42 | 10.800 |
| *12 | 24.467 | 11.31 | | | 10.128 |

-continued

Unit: mm

| | | | | | |
|---|---|---|---|---|---|
| *13 | −141.247 | 3.67 | 1.74320 | 49.30 | 10.800 |
| *14 | −29.627 | Variable | | | 11.415 |
| 15 | 691.825 | 0.80 | 1.84666 | 23.78 | 11.937 |
| 16 | 126.000 | 14.82 | | | 11.972 |
| 17 | ∞ | 1.50 | 1.51680 | 64.20 | 15.000 |
| 18 | ∞ | 0.80 | | | 15.000 |
| IM | ∞ | | | | |

Data about Aspheric Surface

| i | 11 | 12 | 13 | 14 |
|---|---|---|---|---|
| K | 0 | 0 | 0 | 0 |
| A4 | 1.730E−05 | 3.623E−05 | −2.391E−05 | −6.439E−06 |
| A6 | −2.279E−08 | −4.500E−08 | −2.384E−07 | −1.917E−07 |
| A8 | 7.164E−10 | 1.460E−09 | 1.462E−10 | 1.485E−10 |
| A10 | 0.000E+00 | 0.000E+00 | 0.000E+00 | 0.000E+00 |
| A12 | 0.000E+00 | 0.000E+00 | 0.000E+00 | 0.000E+00 |

Various Types of Data

| | |
|---|---|
| FL | 36.0 |
| FNO | 1.44 |
| 2ω | 43.1 |
| TL | 75.0 |

Variable Parameters

| Distance to Object | Aperture Radius | d10 | d14 |
|---|---|---|---|
| ∞ (POS1) | 9.865 | 5.35 | 1.00 |
| 320 mm (POS2) | 7.177 | 1.00 | 5.35 |

TABLE 1

| Value Corresponding to Condition Expression and Data Related to Value | | Example 1 | Example 2 | Example 3 | Example 4 |
|---|---|---|---|---|---|
| FL | | 36.00 | 34.93 | 35.50 | 34.39 |
| 1Gr_Fl | | 91.20 | 98.04 | 98.15 | 122.95 |
| 2Gr_Fl | | 40.86 | 39.43 | 41.21 | 39.62 |
| 1Gr_R_nop | | 13.25 | 10.72 | 10.32 | 10.32 |
| 1Gr_Thi | | 30.44 | 29.16 | 29.86 | 31.76 |
| 2Gr_R_Fl | | 35.80 | 53.40 | 46.78 | 79.77 |
| y_max | | 14.20 | 14.20 | 14.20 | 14.20 |
| (1) | 1Gr_Fl/FL | 2.53 | 2.85 | 2.77 | 3.57 |
| (2) | 2Gr_Fl/FL | 1.14 | 1.15 | 1.16 | 1.15 |
| (3) | 1Gr_R_nop/1Gr_Thi | 0.56 | 0.63 | 0.65 | 0.68 |
| (4) | 2Gr_R_Fl/2Gr_Fl | 0.88 | 1.35 | 1.14 | 2.01 |
| (5) | W_2Gr(Weight of Focus Group) | 14.73 | 14.07 | 13.02 | 8.80 |
| (6) | arctan(y_max/FL) | 21.53 | 22.43 | 21.80 | 22.43 |

| Value Corresponding to Condition Expression and Data Related to Value | | Example 5 | Example 6 | Example 7 |
|---|---|---|---|---|
| FL | | 34.40 | 34.40 | 36.00 |
| 1Gr_Fl | | 93.52 | 117.37 | 103.88 |
| 2Gr_Fl | | 42.19 | 37.32 | 37.01 |
| 1Gr_R_nop | | 7.93 | 13.39 | 8.80 |
| 1Gr_Thi | | 30.24 | 30.36 | 32.18 |
| 2Gr_R_Fl | | 52.08 | 54.13 | 49.51 |
| y_max | | 14.20 | 14.20 | 14.20 |
| (1) | 1Gr_Fl/FL | 2.72 | 3.41 | 2.89 |
| (2) | 2Gr_Fl/FL | 1.23 | 1.08 | 1.03 |
| (3) | 1Gr_R_nop/1Gr_Thi | 0.74 | 0.56 | 0.73 |
| (4) | 2Gr_R_Fl/2Gr_Fl | 1.23 | 1.45 | 1.34 |
| (5) | W_2Gr(Weight of Focus Group) | 17.99 | 14.53 | 11.96 |
| (6) | arctan(y_max/FL) | 22.43 | 22.43 | 21.53 |

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image-capturing optical system comprising:
a positive first lens group; and
a positive second lens group,
wherein the positive first lens group and the positive second lens group are arranged in order from an object side in the image-capturing optical system,
the image-capturing optical system focuses on a close object by moving the second lens group as a whole along a light axis toward the object side,
a lens closest to the object side in the second lens group has a convex surface facing the object side,
a lens closest to an image side in the second lens group is a positive meniscus lens having a convex surface facing the image side,
the image-capturing optical system satisfies following condition expressions (1) to (3)

$$2.2 < 1Gr\_Fl/FL < 3.8 \quad (1)$$

$$0.9 < 2Gr\_Fl/FL < 1.5 \quad (2), \text{ and}$$

$$0.45 < 1Gr\_R\_nop/1Gr\_Thi < 0.85 \quad (3)$$

the FL indicates a focal length of the image-capturing optical system,
the 1Gr_Fl indicates a focal length of the first lens group,
the 2Gr_Fl indicates a focal length of the second lens group,
the 1Gr_R_nop indicates a distance from a surface closest to the object side to a position of a back principal point in the first lens group, and
the 1Gr_Thi indicates a whole length of the first lens group.

2. The image-capturing optical system according to claim 1, wherein the lens closest to the object side in the second lens group has a positive power.

3. The image-capturing optical system according to claim 1 satisfying a following condition expression (4)

$$0.7 < 2Gr\_R\_Fl/2Gr\_Fl < 2.5 \quad (4)$$

wherein the 2Gr_R_Fl indicates a focal length of the positive lens placed closest to the image side in the second lens group.

4. The image-capturing optical system according to claim 3, satisfying a following condition expression (5)

$$W\_2Gr < 25 \quad (5)$$

wherein the W_2Gr indicates a total weight (g) of lens elements included in the second lens group.

5. The image-capturing optical system according to claim 3, configured to form an optical image of a subject on an image-capturing surface of an image-capturing element and satisfying a following condition expression (6)

$$20 < \arctan(y\_max/FL) < 25 \quad (6)$$

wherein the y_max indicates a maximum image height,
the FL indicates a focal length of the image-capturing optical system, and
a diagonal length of a screen size of the image-capturing surface is 2y_max.

6. The image-capturing optical system according to claim 1, wherein the positive lens closest to the image side in the second lens group has an aspheric shape.

7. The image-capturing optical system according to claim 1, further comprising:
a diaphragm in the first lens group.

8. The image-capturing optical system according to claim 1, wherein a lens closest to the image side in the first lens group has a convex surface facing the image-surface.

9. An image-capturing optical apparatus comprising:
the image-capturing optical system according to claim 1; and
an image-capturing element configured to convert an optical image formed on an image-capturing surface into an electric signal,
wherein the image-capturing optical system is provided in the image-capturing optical apparatus so as to form an optical image of a subject on the image-capturing surface of the image-capturing element.

10. A digital device that includes at least one of a function for shooting a still image of a subject and a function for shooting a movie of a subject by including the image-capturing optical apparatus according to claim 9.

* * * * *